US010558085B2

(12) United States Patent
Tomotoshi et al.

(10) Patent No.: US 10,558,085 B2
(45) Date of Patent: Feb. 11, 2020

(54) LIQUID CRYSTAL DISPLAY DEVICE

(71) Applicant: SHARP KABUSHIKI KAISHA, Sakai, Osaka (JP)

(72) Inventors: Takuma Tomotoshi, Sakai (JP); Mitsuhiro Murata, Sakai (JP); Yosuke Iwata, Sakai (JP); Satoshi Matsumura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/316,141

(22) PCT Filed: Jul. 5, 2017

(86) PCT No.: PCT/JP2017/024568
§ 371 (c)(1),
(2) Date: Jan. 8, 2019

(87) PCT Pub. No.: WO2018/012356
PCT Pub. Date: Jan. 18, 2018

(65) Prior Publication Data
US 2019/0212615 A1 Jul. 11, 2019

(30) Foreign Application Priority Data

Jul. 12, 2016 (JP) ................ 2016-137923

(51) Int. Cl.
G02F 1/1337 (2006.01)
G02F 1/1343 (2006.01)
G02F 1/1368 (2006.01)

(52) U.S. Cl.
CPC ...... *G02F 1/133707* (2013.01); *G02F 1/1343* (2013.01); *G02F 1/1368* (2013.01);
(Continued)

(58) Field of Classification Search
CPC .............................. G02F 1/133707
See application file for complete search history.

(56) References Cited

U.S. PATENT DOCUMENTS

2002/0041354 A1    4/2002   Noh et al.
2013/0329147 A1*  12/2013   Murata ............ G02F 1/134363
                                                         349/33
(Continued)

FOREIGN PATENT DOCUMENTS

JP    2002-182230 A    6/2002
WO    2016/088658 A1   6/2016

*Primary Examiner* — Edmond C Lau
(74) *Attorney, Agent, or Firm* — ScienBiziP, P.C.

(57) ABSTRACT

The present invention provides a liquid crystal display device capable of achieving a high contrast ratio, a wide viewing angle, and a high-speed response. The liquid crystal display device includes an upper substrate; a lower substrate; and a liquid crystal layer sandwiched between the upper substrate and the lower substrate. The lower substrate includes a first electrode, and a second electrode and a third electrode arranged in a layer different from the first electrode. The first electrode includes a trunk portion and multiple branch portions branching from the trunk portion and is provided with an opening between the branch portions. The second electrode and the third electrode constitute a pair of comb-shaped electrodes and each include a trunk portion and multiple branch portions branching from the trunk portion. The branch portions of the first electrode are each bent at a predetermined angle. The electrodes each have a predetermined configuration.

10 Claims, 15 Drawing Sheets

(52) U.S. Cl.
CPC .. *G02F 1/133711* (2013.01); *G02F 1/133784* (2013.01); *G02F 1/134309* (2013.01); *G02F 1/134363* (2013.01); *G02F 2001/134318* (2013.01)

(56) References Cited

U.S. PATENT DOCUMENTS

| | | | | |
|---|---|---|---|---|
| 2015/0153620 | A1* | 6/2015 | Iwata | G02F 1/134309 349/123 |
| 2015/0177571 | A1* | 6/2015 | Yoshida | G02F 1/134363 349/33 |
| 2017/0343869 | A1 | 11/2017 | Matsumura et al. | |

* cited by examiner

Liquid crystal initial orientation

— Region 1

— Region 2

Liquid crystal initial orientation (i) 0V (ii) 1.3V/−1.3V (iii) −1.3V/1.3V

— Upper layer electrode (i) voltage value
- - - - Lower layer electrode (ii) voltage value
••••••• Lower layer electrode (iii) voltage value Liquid crystal initial orientation Example 1  SN ratio 0.59

Comparative Example 1  SN ratio −8.93

Liquid crystal initial orientation

Liquid crystal orientation during white display

Voltage application (5 V) to upper layer electrode (i)

Second drive system

Example 6  SN ratio 0.87

Example 7  SN ratio −1.11

Comparative Example 3  SN ratio −4.81

Comparative Example 5  SN ratio −4.14

Relationship between distance A and SN ratio

Relationship between distance B and SN ratio

Relationship between angle C and SN ratio

Relationship between angle D and SN ratio

LIQUID CRYSTAL DISPLAY DEVICE

TECHNICAL FIELD

The present invention relates to a liquid crystal display device. More specifically, the present invention relates to a liquid crystal display device of a car navigation system and the like suitable for being used both in a high temperature environment and in a low temperature environment.

BACKGROUND ART

The liquid crystal display device sandwiches a liquid crystal display element between a pair of glass substrates or the like, and is an indispensable device for everyday life and business, such as a car navigation system, an electronic book, a photo frame, industrial equipment, a television, a personal computer, a smart phone, and a tablet terminal, by making the most of its features such as thinness, light weight, and low power consumption. In these applications, liquid crystal display devices of various modes relating to the electrode arrangement for changing the optical characteristics of the liquid crystal layer and the design of the substrate are studied.

Display modes of liquid crystal display devices in recent years include a vertical alignment (VA) mode such as a multi-domain vertical alignment (MVA) mode of vertically aligning liquid crystal molecules having negative anisotropy of dielectric constant with the substrate surface, an in-plane switching (IPS) mode of horizontally aligning liquid crystal molecules having positive or negative anisotropy of dielectric constant with the substrate surface to apply a lateral electric field to the liquid crystal layer, and a fringe field switching (FFS) mode.

Among them, the FFS mode is a liquid crystal mode widely used in smartphones and tablet terminals in recent years. An FFS mode liquid crystal display device including, for example, first and second transparent insulating substrates arranged to face each other at a predetermined distance via a liquid crystal layer containing multiple liquid crystal molecules, multiple gate bus lines and data bus lines formed on the first transparent substrate and arranged in a matrix form so as to define unit pixels, a thin-film transistor provided at an intersection of the gate bus line and the data bus line, a counter electrode disposed in each of the unit pixels and made of a transparent conductor, multiple upper part slits and lower part slits arranged to be insulated from the counter electrode in each unit pixel so as to form a fringe field together with the counter electrode and arranged at a predetermined inclination so as to be symmetrical about the long side of the pixel, and a pixel electrode made of a transparent conductor is disclosed (for example, see Patent Literature 1).

In addition, a liquid crystal display device including upper and lower substrates and a liquid crystal layer sandwiched between the upper and lower substrates, the lower substrate including electrodes, the electrodes including a first electrode, a second electrode in a layer different from the first electrode, and a third electrode in the same layer as the second electrode, the liquid crystal layer including liquid crystal molecules horizontally aligned with respect to the main surface of the upper and lower substrates during voltage non-application, the liquid crystal display device configured to perform a driving operation of causing the electrodes to generate an electric field which rotates some of the liquid crystal molecules in a horizontal plane with respect to the main surface and rotates others of the liquid crystal molecules in a direction opposite to the direction of some of the liquid crystal molecules in a horizontal plane with respect to the main surface, is disclosed (for example, see Patent Literature 2).

CITATION LIST

Patent Literature

Patent Literature 1: JP 2002-182230 A
Patent Literature 2: WO 2016/088658

SUMMARY OF INVENTION

Technical Problem

The FFS mode liquid crystal display device described in Patent Literature 1 discloses that the liquid crystal display device has wide viewing angle characteristics and improves a low aperture ratio and low transmittance of the IPS mode liquid crystal display device (see, for example, FIG. 6 described in Patent Literature 1. FIG. 6 described in Patent Literature 1 shows a planar pixel structure of an FFS mode liquid crystal display device). However, in the FFS mode liquid crystal display device described in Patent Literature 1, during the rise time, the application of an electric field can cause the liquid crystal to forcibly respond, but during the falling time, since the application of the electric field is stopped and the viscoelasticity of the liquid crystal is entrusted with the response, the response is slow as compared with the vertical alignment mode such as the MVA mode, and there is room for improvement in response characteristics.

In the FFS mode liquid crystal display device described in Patent Literature 1, an upper layer electrode provided with a slit and a planar lower layer electrode via the upper layer electrode and the insulating layer are arranged on the lower substrate. In the liquid crystal display device, during the rise time, a constant voltage is applied to the upper layer electrode (for example, the potential difference between the upper layer electrode and the lower layer electrode has only to be not less than a threshold value, and has only to be capable of responding in a fringe field), and during the falling time, the potential difference between the upper layer electrode and the lower layer electrode is made less than the threshold value, and response is made by stopping (weakening) the fringe field.

In the conventional FFS mode, as described above, generating a fringe field at the electrode of the lower substrate (hereinafter also referred to as FFS electrode) and rotating the liquid crystal molecules near the FFS electrode of the lower substrate in the same direction in the horizontal plane causes the switching during the rise time to be performed. In addition, switching during the falling time is performed by turning off the fringe field to return the liquid crystal molecules to the original alignment state by viscoelasticity.

However, in the liquid crystal layer, there is a region where the electric field for rotating the liquid crystal molecules is weak, and it takes time to rotate the liquid crystal molecules in the region. In addition, at this time, since the liquid crystal molecules basically rotate in the same direction when the longitudinal directions of multiple slits are regularly arranged in parallel, the strain due to the elastic deformation of the liquid crystal in the horizontal plane is small. Therefore, when switching is performed during the falling time by turning off the electric field, the restoring force caused by the elastic strain working to return to the original alignment state is small and the response is slow. Therefore, both the switching during the rising time and the switching during the falling time have slow response time.

Here, the inventors have focused attention on the electrode structure of the lower substrate. Then, in the conventional FFS mode liquid crystal display device, the electrodes of the lower substrate includes electrodes, arranged in two layers, to which two kinds of different voltages can be applied, but the inventors have assumed that the electrodes of the lower substrate includes electrodes, arranged in at least two layers, to which three kinds of different voltages can be applied, and a pair of comb-shaped electrodes are arranged in at least one layer. Then, the inventors have found that not only a wide viewing angle, but also a high-speed response can be achieved in such a liquid crystal display device (the liquid crystal display device described in Patent Literature 2). For example, applying polarity reversed voltages with the amplitude center set to 0 V so that the polarities are opposite to each other to a pair of comb-shaped electrodes to which two kinds of different voltages can be applied always generates a lateral electric field, and applying a polarity reversed voltage according to a gray scale to a pixel electrode provided in a layer different from the pair of comb-shaped electrodes drives the liquid crystal display device. Thus, the response is speeded up, and the moving image visibility is improved as compared with those in the FFS mode. Hereinafter, such a drive system is also referred to as a first drive system. It should be noted that the amplitude center means an average value (intermediate value) between the maximum value and the minimum value of the AC voltage. In addition, in the liquid crystal display device, as in the voltage application method in the conventional FFS mode liquid crystal display device, both voltages of a pair of comb-shaped electrodes are set to 0 V, and applying a voltage according to the gray scale to a pixel electrode provided in a layer different from the layer of the pair of comb-shaped electrodes also allows a fringe electric field between the upper and lower layer electrodes to be generated to drive the liquid crystal. In this case, a transmittance higher than that of the first drive system can be achieved. Hereinafter, this drive system is also referred to as a second drive system. For example, it is also possible to achieve a liquid crystal display device that can automatically switch between the first drive system and the second drive system according to the purpose by controlling the voltage application method.

Incidentally, in the drive (first drive system) in which the response speed is faster than that in the FFS mode of the liquid crystal display device described in Patent Literature 2, there is room for contrivance to improve the contrast ratio by preventing black floating (the transmittance does not sufficiently decrease during black display) caused by always applying a voltage to the lower layer electrode of the lower substrate. To cope with this, furthermore, the inventors increased the width of a specific one electrode of a pair of comb-shaped electrodes as compared with the width of the other electrode. Thus, the liquid crystal can be made to have a desired alignment during black display of the first drive system, and the transmittance can be sufficiently lowered.

On the other hand, in the liquid crystal display device, in the case of the second drive system, alignment disorder of the liquid crystal sometimes occurs depending on the opening shape at the pixel end (upper layer electrode end portion). The inventors have found that, as a cause thereof, since the lower layer electrode is a comb-shaped electrode, the generated electric field is different from that in the central part of the pixel in the region where there is no lower layer electrode near the pixel end during the second drive system, so that alignment disorder of the liquid crystal sometimes occurs.

The present invention is made in view of the current state, and has an object to provide a liquid crystal display device capable of achieving a high contrast ratio, a wide viewing angle, and a high-speed response.

Solution to Problem

In the liquid crystal display device in which the electrodes of the lower substrate include a pair of comb-shaped electrodes and a pixel electrode provided in a layer different from those of the pair of comb-shaped electrodes and which can achieve the first drive system or the second drive system depending on the voltage application method, the inventors have specified the shape of the upper layer electrode at the pixel end portion, and have set the linear portion of the upper layer electrode end portion to a specific bending structure. With the electrode structure thus specified, the inventors have been able to stabilize the alignment of the liquid crystal in the vicinity of the pixel end, have come up with the idea that can solve the above problems, and have reached the present invention.

That is, one aspect of the present invention may be a liquid crystal display device including an upper substrate; a lower substrate; and a liquid crystal layer sandwiched between the upper substrate and the lower substrate, wherein the lower substrate includes a first electrode, and a second electrode and a third electrode arranged in a layer different from the first electrode, the first electrode includes a trunk portion and multiple branch portions branching from one side of the trunk portion and is provided with an opening between the branch portions, the second electrode and the third electrode constitute a pair of comb-shaped electrodes and each include a trunk portion and multiple branch portions branching from one side of the trunk portion, one of the branch portions of the second electrode has a part overlapping with the trunk portion of the first electrode and another part being in the opening of the first electrode when the lower substrate is viewed in a plan view so that an edge on the other side of the trunk portion of the first electrode extends in a lateral direction on an upper side of the first electrode, the branch portions in the first electrode each include a bending point, the liquid crystal display satisfies following Inequalities (1) to (4) where A is a vertical distance between an upper end and a lower end of the another part in the opening, B is a distance between the bending point and a center line between upper and lower ends of a branch portion of the third electrode, C is an angle formed between an extending direction of the branch portion of the second electrode and an extending direction of an edge on the one side of the trunk portion of the first electrode, and D is an angle formed between an extending direction of the trunk portion of the second electrode and an extending direction of an upper side portion from the bending point of a branch portion of the first electrode, and the liquid crystal layer contains liquid crystal molecules aligned in a horizontal direction when no voltage is applied to each electrode, $$1.5 \ \mu m \leq A \tag{1}$$

$$0 \ \mu m \leq B \leq 5.1 \ \mu m \tag{2}$$

$$0° \leq C \leq 20° \tag{3}$$

$$6.5° \leq D \leq 25° \tag{4}$$

The above "side of the trunk portion" refers to an edge along the longitudinal direction of the trunk portion. In the first electrode, the side of the trunk portion normally includes a side where a branch portion branches and a side where no branch portion branches.

The "the lower substrate is viewed in a plan view so that an edge on the other side of the trunk portion of the first electrode extends in a lateral direction on an upper side of the first electrode" means that the main surface of the lower substrate is viewed in a plan view such that one of the edges on the sides along the longitudinal direction of the trunk portion of the first electrode, from which no branch portion branches, is on the upper side of the trunk portion.

The first electrode may be an electrode including one trunk portion and multiple branch portions branching from one edge on a side of the trunk portion (comb-shaped electrode), or may be an electrode including a pair of trunk portions opposed to each other and multiple branch portions connected to each of the pair of trunk portions and extending between the trunk portions (slit electrode). In other words, it is preferable that the first electrode is provided with a slit or is a comb-shaped electrode. Whether the first electrode is a comb-shaped electrode or a slit electrode, an opening is provided between the branch portions. When the first electrode is a slit electrode, the opening is normally surrounded by a frame of the electrode on the four sides thereof. In addition, when the first electrode is a comb-shaped electrode, normally three sides of the four sides of the opening are surrounded by a frame of an electrode, and the remaining one is open. It should be noted that each of the second electrode and the third electrode is a comb-shaped electrode, and both electrodes form a pair of comb-shaped electrodes. Herein, an electrode whose shape is a comb shape is not referred to as an electrode provided with a slit, but is referred to as a comb-shaped electrode.

In the case where the first electrode is a slit electrode, when the lower substrate is viewed in a plan view so that the edge on the side where no branch portion branches extends in the lateral direction on the upper side of the first electrode, one of the pair of trunk portions has only to satisfy above Inequalities (1) to (4), but when the lower substrate is viewed in a plan view so that the edge on the side where no branch portion branches extends in the lateral direction on the upper side of the first electrode, any of each of the pair of trunk portions preferably satisfies Inequalities (1) to (4). Thus, not only the electrode structure on the upper end side of the pixel but also the electrode structure on the lower end side can be properly specified.

The "one of the branch portions of the second electrode has a part overlapping with the trunk portion of the first electrode and another part being in an opening of the first electrode" means that a part of one of the branch portions of the second electrode has only to overlap the trunk portion of the first electrode, and the whole or a part of the other part has only to be in the opening.

The "an upper end of the another part in the opening" in "vertical distance between an upper end and a lower end of the another part in the opening" (A) means the uppermost end of the region in the opening in one of the branch portions of the second electrode (part thereof overlaps the trunk portion of the first electrode). The upper end may be a line, or may be a point as shown in FIG. 15. Similarly, the "lower end" means the lowermost end of the region in the opening in one of the branch portions of the second electrode (part thereof overlaps the trunk portion of the first electrode). The lower end may be a line as shown in FIG. 15, or may be a point. The "vertical distance" refers to a distance of the vertical direction component when the lower substrate is viewed in a plan view as described above. For example, the distance A is a distance denoted by A shown in FIG. 15. The distance A is calculated for each upper side of the opening, and may be the same or different. In the liquid crystal display device of the present invention, the distance A at the upper end of a certain one opening has only to satisfy Inequality (1), but the distance A at each opening preferably satisfies Inequality (1).

The distance A is the most important feature in the present invention. The distance A is preferably 1.6 µm or more, more preferably 1.8 µm or more, still more preferably 1.9 µm or more, particularly preferably 2.8 µm or more. Although the upper limit of the distance A is not particularly limited, for example, the distance A is preferably 8 µm or less.

The "the branch portions in the first electrode each include a bending point, and a distance between the bending point and a center line between upper and lower ends of a branch portion of the third electrode" (B) means a distance between the bending point of the branch portion of the first electrode and a center line between upper and lower ends of a branch portion of the third electrode on the lower side of the bending point. The branch portion of the third electrode used for calculating the distance B is a branch portion of the third electrode closest to the bending point when there are multiple branch portions of the third electrode on the lower side of the bending point. In addition, "a center line between the upper and lower ends of the branch portion of the third electrode" means a line passing through equidistant points from the upper end and the lower end of the branch portion of the third electrode (a line bisecting the width of the branch portion of the third electrode), and normally extends in the longitudinal direction (lateral direction) of the branch portion of the third electrode. Therefore, the distance B is normally a distance of the vertical direction component. Furthermore, the bending point is a bending point of an edge on the opening side of the bending branch portion. For example, the distance B is a distance denoted by B shown in FIG. 15. The distance B is basically calculated for each of the upper sides of the opening, and may be the same or different. In the liquid crystal display device of the present invention, at least one of the distances B has only to satisfy above Inequality (2), but each of the distances B preferably satisfies above Inequality (2). The branch portion of the first electrode may be bent at multiple places, and in that case, the bending point used for calculating the distance B is a bending point closest to the center of the pixel.

In the present invention, the distance B is an important feature next to the distance A. The distance B is preferably 5 µm or less, more preferably 4 µm or less, still more preferably 3 µm or less, and particularly preferably 0.8 µm or less. It should be noted that in one aspect of the present invention, the lower limit of the distance B may be 0 µm.

The "an angle formed between an extending direction of the branch portion of the second electrode and an extending direction of an edge on the one side of the trunk portion of the first electrode" (C) means an acute angle of the angles formed by the extending direction of the branch portion of the second electrode and the extending direction of an edge on the one side of the trunk portion of the first electrode. The "an edge on the one side of the trunk portion of the first electrode" means an edge on one of sides of the trunk portion of the first electrode (the edge on the side where a branch portion branches) and an edge of the portion where no branch portion protrudes. The "extending direction" means a direction along the longitudinal direction and the edge of the electrode. For example, the angle C is an angle denoted by C shown in FIG. 15. The angle C is basically calculated for each of the upper sides of the opening, and may be the same or different. In the liquid crystal display device of the present invention, at least one of the angles C has only to satisfy above Inequality (3), but each of the angles C preferably satisfies above Inequality (3). In addition, for example, the edge of the first electrode may be bent and multiple extending directions thereof may be used, and in this case, the smallest angle of the angles formed by the extending direction of the branch portion of the second electrode and the extending direction of one edge on the one side of the trunk portion of the first electrode is defined as the angle C.

Although the angle C is important, its importance is lower than those of the distance A, the distance B, and the angle D. The angle C is preferably 18° or less, more preferably 15° or less, still more preferably 12° or less, and particularly preferably 3° or less. It should be noted that in one aspect of the present invention, the lower limit of the angle C may be 0°.

The "an angle formed between an extending direction of the trunk portion of the second electrode and an extending direction of an upper side portion from the bending point of a branch portion of the first electrode" (D) means an acute angle of the angles formed between the extending direction of the trunk portion of the second electrode and the extending direction of an upper side portion from the bending point of the branch portion of the first electrode. For example, the angle D is an angle denoted by D shown in FIG. 15. The angle D is basically calculated for each of the upper sides of the opening, and may be the same or different. In the liquid crystal display device of the present invention, at least one of the angles D has only to satisfy above Inequality (4), but each of the angles D preferably satisfies above Inequality (4). In addition, the branch portion of the first electrode may be bent at multiple places, and in that case, there are multiple "extending directions of a portion on an upper side of the bending point", so that there are multiple angles D. In this case, it is preferable that each of the angles D on the upper side of the opening satisfies above Inequality (4).

In the present invention, the angle D is an important feature equivalent to the distance B described above. The angle D is preferably 8° or more, more preferably 9° or more, still more preferably 9.5° or more, and particularly preferably 17° or more. In addition, in one aspect of the present invention, the upper limit value of the angle D may be 25°. The upper limit value of the angle D is preferably 20°. For example, furthermore, the liquid crystal display device of the present invention preferably satisfies following Inequality (5), $$D \leq 20°$$ (5).

As described above, when the lower substrate is viewed in a plan view, the branch portions of the first electrode normally intersect the branch portions of the second electrode and the branch portions of the third electrode. For example, it is preferable that the branch portions of the first electrode intersect substantially at right angles (intersect at an angle of 75 to 90°) with the branch portion of the second electrode and the branch portion of the third electrode.

The average width of the branch portions of the third electrode is larger than the average width of the branch portions of the second electrode, which is one of preferable aspects of the liquid crystal display device of the present invention. The average width means an average width calculated for each branch portion.

In addition, it is configured to execute a driving operation in which the potential difference between the first electrode and the third electrode is not less than the potential difference between the first electrode and the second electrode, which is one of preferable aspects of the liquid crystal display device of the present invention. Furthermore, the liquid crystal display device of the present invention is preferably configured to execute a driving operation in which the polarity of the voltage applied to the first electrode is the same as the polarity of the voltage applied to the second electrode and opposite to the polarity of the voltage applied to the third electrode.

In the liquid crystal mode of the liquid crystal display device of the present invention, the initial alignment of the liquid crystal is a parallel type (meaning that the long axis of the liquid crystal molecule is substantially parallel to the main surface of the substrate. Also, hereinafter, the alignment of the liquid crystal [orientation] means a direction of the long axis of the liquid crystal molecule).

In the liquid crystal display device of the present invention, including this electrode structure allows the drive that makes response faster than the drive in FFS mode (first drive system) and the drive that can obtain a higher transmittance than the drive thereof (second drive system) to be achieved by switching the voltages to be applied according to the purpose, and not only a high transmittance and a wide viewing angle but also a high speed response to be achieved.

In one aspect of the liquid crystal display device of the present invention, the average width of the branch portions of the third electrode is preferably 5.5 μm or more and 13 μm or less.

In addition, in another aspect of the liquid crystal display device of the present invention, the average width of the branch portions of the third electrode is preferably larger than the average width of the branch portions of the second electrode by 2.5 μm or more.

In another aspect of the liquid crystal display device of the present invention, the average interval between the branch portion of the second electrode and the branch portion of the third electrode is preferably 2.5 μm or more and 4.5 μm or less.

The liquid crystal display device of the present invention is preferably configured to execute a driving operation, wherein the driving operation causes an electrode included in the lower substrate to generate an electric field for rotating liquid crystal molecules so that not less than two first regions and not less than two second regions are alternately arranged in a pixel, the first regions each rotating a first group of the liquid crystal molecules in a horizontal plane with respect to a main surface of the upper and lower substrates, the second regions each rotating a second group of the liquid crystal molecules in a direction opposite to the first group of the liquid crystal molecules in a horizontal plane with respect to the main surface. This electric field is generated by the first drive system. It should be noted that "not less than two first regions and not less than two second regions are alternately arranged" means that not less than two first regions and not less than two second regions may be alternately arranged in stripes, or they may be alternately arranged in a staggered lattice pattern. It should be noted that the first group of the liquid crystal molecules means multiple liquid crystal molecules constituting a part of multiple liquid crystal molecules contained in the liquid crystal layer. The same applies to the second group of the liquid crystal molecules, which means multiple liquid crystal molecules other than the first group of the liquid crystal molecules of multiple liquid crystal molecules contained in the liquid crystal layer.

The "an electrode included in the lower substrate to generate an electric field" has only to generate the electric field with at least one electrode selected from the first electrode, the second electrode, and the third electrode, and for example, when the liquid crystal display device is powered on, it is preferable to always generate a lateral electric field between the second electrode and the third electrode and perform the drive by applying a voltage to the first electrode. "Performing the drive by applying a voltage to the first electrode" specifically means rotating the liquid crystal molecules by increasing the voltage applied to the first electrode during white display and rotating the liquid crystal molecules in the reverse direction by decreasing the voltage of the first electrode during black display.

It should be noted that in the liquid crystal display device of the present invention, the first electrode has only to be arranged in a layer different from the respective layers of the second electrode and the third electrode, and the first electrode is preferably arranged on a side closer to the liquid crystal layer than the second electrode and the third electrode. For example, it is preferable that the first electrode is arranged on the second electrode and the third electrode via an insulating layer or the like.

In addition, the second electrode and the third electrode may be arranged in different layers, but are preferably arranged in the same layer. A pair of comb-shaped electrodes being arranged in the same layer means that each comb-shaped electrode is in contact with a common member (such as an insulation layer or a liquid crystal layer) on the liquid crystal layer side and/or the side opposite to the liquid crystal layer side.

In the liquid crystal display device of the present invention, each of the first electrode, the second electrode, and the third electrode is normally electrically separated, and these voltages can be individually controlled. In other words, normally, the first electrode, the second electrode, and the third electrode can be applied with respective voltages, different from each other, not less than a threshold voltage.

In the liquid crystal display device of the present invention, the electrodes for driving the liquid crystal may be arranged on the upper substrate, or do not have to be arranged, and it is preferable that they are not arranged, for example. That is, it is one of preferable aspects of the liquid crystal display device of the present invention that electrodes for liquid crystal driving are arranged only in the lower substrate.

Then, the liquid crystal display device of the present invention is preferably configured to switch between a first drive system and a second drive system, wherein the first drive system executes the driving operation, and the second drive system executes a driving operation of causing an electrode included in the lower substrate to generate an electric field for rotating liquid crystal molecules so that the number of first regions is not more than one and the number of second regions is not more than one in a pixel, the first regions each rotating a first group of the liquid crystal molecules in a horizontal plane with respect to a main surface of the upper and lower substrates, the second regions each rotating a second group of the liquid crystal molecules in a direction opposite to the first group of the liquid crystal molecules in a horizontal plane with respect to the main surface. The "the number of first regions . . . is not more than one and the number of second regions . . . is not more than one" means, for example, that the number of first regions is one, and the number of second regions is one or none (zero). Rotating in a horizontal plane has only to rotate substantially in one direction in a horizontal plane. In addition, in the second drive system, the "an electrode included in the lower substrate generates an electric field" has only to generate the electric field with at least one electrode selected from the first electrode, the second electrode, and the third electrode, and for example, when the liquid crystal display device is powered on, it is preferable not to apply a voltage to the second electrode and the third electrode, and it is preferable to perform the drive by applying a voltage to the first electrode. "Performing the drive by applying a voltage to the first electrode" means, as described above, increasing the voltage applied to the first electrode during white display to generate an electric field to rotate the liquid crystal molecules, and decreasing the voltage applied to the first electrode during black display to weaken or reduce the electric field to zero to rotate the liquid crystal molecules in the reverse direction.

In the liquid crystal display device of the present invention, it is preferable that the liquid crystal molecules have positive anisotropy of dielectric constant.

In the liquid crystal display device of the present invention, it is preferable that the lower substrate includes a thin-film transistor element including an oxide semiconductor.

The configuration of the liquid crystal display device of the present invention is not particularly limited by the other components, and the other structures normally used for a liquid crystal display device can be appropriately applied.

Advantageous Effects of Invention

According to the liquid crystal display device of the present invention, a high contrast ratio and a wide viewing angle can be achieved and a high-speed response can be achieved.

DESCRIPTION OF EMBODIMENTS

Figure 1:
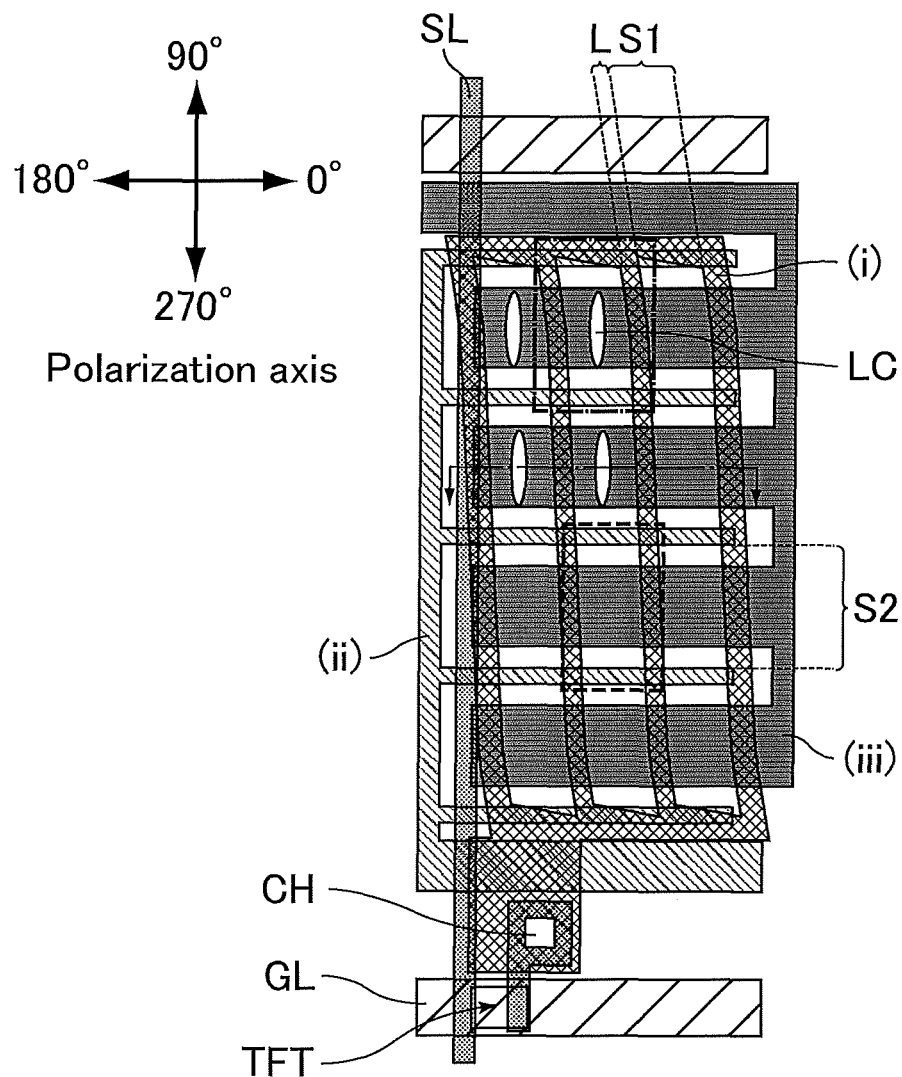
FIG. 1 is a schematic plan view showing an electrode structure of a pixel and initial alignment of a liquid crystal in the liquid crystal display device of Example 1.

In the following, examples are given, and the present invention will be described in more detail with reference to the drawings, but the present invention is not limited to only these examples. Herein, the pixel may be a sub pixel unless otherwise stated. The sub pixel means a region showing any monochrome such as red (R), green (G), blue (B), or yellow (Y). In addition, a pair of substrates sandwiching the liquid crystal layer are also referred to as upper and lower substrates, and of these, a substrate on the display surface side is referred to as an upper substrate, and a substrate on the side opposite to the display surface is also referred to as a lower substrate. Furthermore, of the electrodes arranged on the substrate, the electrode on the display surface side is also referred to as an upper layer electrode, and the electrode on the side opposite to the display surface side is also referred to as a lower layer electrode.

It should be noted that in each example, members and parts that exhibit similar functions are denoted by the same reference numerals. In addition, in the drawings, unless otherwise noted, (i) indicates a slit electrode in the upper layer of the lower substrate (liquid crystal layer side), (ii) indicates a comb-shaped electrode in the lower layer of the lower substrate (the side opposite to the liquid crystal layer side), and (iii) indicates another comb-shaped electrode in the lower layer of the lower substrate. It should be noted that the upper layer electrode (i) may be a comb-shaped electrode. The lower layer electrode (ii) and the lower layer electrode (iii) face each other when the substrate main surface is viewed in a plan view. In addition, in the drawings, the layers not relating to the electric field control of the liquid crystal, such as the color filter and the black matrix, are omitted.

Herein, the electrode of the lower substrate means at least one of the upper layer electrode (i), the lower layer electrode (ii), and the lower layer electrode (iii).

Herein, the slit electrode refers to an electrode provided with a slit, and normally includes multiple linear portions (linear electrode portions). Herein, the slit is an opening of the electrode, and a region surrounded by a frame of the electrode in all directions, for example.

The upper layer electrode (i), the lower layer electrode (ii), and the lower layer electrode (iii) can normally be set to different potentials not less than a threshold voltage. Herein, the threshold voltage means a voltage value giving a transmittance of 5% when the transmittance in the bright state is set to 100%. The term "the layer electrodes can normally be set to different potentials not less than a threshold voltage" means that a drive operation of setting the layer electrodes to different potentials not less than a threshold voltage has only to be achieved, and this makes it possible to suitably control the electric field applied to the liquid crystal layer. The configuration that can have different potentials may include: for example, when the upper layer electrode (i) is a pixel electrode and the lower layer electrodes (ii) and (iii) are common electrodes, in addition to connecting a thin-film transistor element (TFT) to the upper layer electrode (i) and applying an AC voltage by varying the value of the voltage to AC-drive the liquid crystal, applying an AC voltage to the lower layer electrodes (ii) and (iii) with another TFT to AC-drive the liquid crystal, applying an AC voltage with TFTs corresponding to the line or all pixels to the lower layer electrodes (ii) and (iii) commonly connected to each line or commonly connected in all pixels to AC-drive the liquid crystal, AC-driving the line or all pixels without using any TFT, and applying a direct current voltage (DC voltage) to the lower layer electrodes (ii) and (iii) without using any TFT to DC-drive the liquid crystal.

Herein, generating an electric field with the electrodes has only to generate the electric field with at least one electrode selected from the first electrode, the second electrode, and the third electrode, and for example, when the liquid crystal display device is powered on, an electric field is always generated between the second electrode and the third electrode, the voltage of the first electrode is increased and the liquid crystal molecules can be rotated during the white display, and the voltage of the first electrode is decreased and the liquid crystal molecules can be rotated in the reverse direction during the black display.

It should be noted that regarding the angle formed by the extending direction of the linear portion of the upper layer electrode (i) and the alignment direction of the liquid crystal molecules, the alignment direction of the liquid crystal molecules forms a positive angle when it forms a clockwise angle with respect to the extending direction of the linear portion of the upper layer electrode (i), and forms a negative angle when it forms a counterclockwise angle with respect to the extending direction of the linear portion of the upper layer electrode (i).

For example, in the liquid crystal display device of the present invention driven by the lateral electric field, it is preferable to arrange two layers of electrodes with the lower layer electrode as a pair of comb-shaped electrodes and the upper layer electrode as a slit electrode (or comb-shaped electrode) via an insulating film. In the liquid crystal display device, a lateral electric field is always applied between a pair of comb-shaped electrodes on the lower layer side (the side opposite to the liquid crystal layer side) of the two layers of electrodes, and it is possible to drive the liquid crystal by applying a voltage to the slit electrode on the upper layer side (or the comb-shaped electrode).

Herein, the rise means a period during which the display state changes from the dark state (black display) to the bright state (white display). In addition, the fall means a period during which the display state changes from the bright state (white display) to the dark state (black display). In addition, the initial alignment of the liquid crystal refers to the alignment of liquid crystal molecules when no voltage is applied.

Example 1

FIG. 1 is a schematic plan view showing an electrode structure of a pixel and initial alignment of a liquid crystal in the liquid crystal display device of Example 1. FIG. 1 shows the lower substrate viewed in a plan view so that, of the sides of the trunk portion of the upper layer electrode (i), the edge on the side from which no branch portion branches extends in the lateral direction on the upper side of the upper layer electrode (i).

The upper layer electrode (i) is a slit electrode and includes multiple linear portions as a branch portion branching from the trunk portion. From the upper side of the pixel, the linear portions are bent between the pixel upper end portion of the and the pixel central portion, and bent between the pixel central portion and the pixel lower end portion, but the respective pixel upper end portions, pixel central portions, and pixel lower end portions of the linear portions are substantially parallel to each other. It should be noted that in FIG. 1, as described above, the upper layer electrode (i) is a slit electrode, and its opening portion is surrounded by the frame of the electrode on the four sides thereof. On the other hand, one side of the opening portion may have no electrode frame and may be opened. In other words, the upper layer electrode (i) may be, for example, a comb-shaped electrode instead of the slit electrode. It is also one of the preferred modes of the present invention that the upper layer electrode (i) has a comb shape.

Each of the lower layer electrode (ii) and the lower layer electrode (iii) includes a trunk portion and a branch portion extending from the trunk portion in a plan view of the lower substrate. Each of the branch portions includes multiple linear electrode portions substantially parallel to each other. Thus, each of the lower layer electrodes (ii) and (iii) is comb shaped.

It should be noted that the structures of the upper layer electrode (i), the lower layer electrode (ii), and the lower electrode layer (iii) shown in FIG. 1 are merely examples, and electrodes of various structures can be used without being limited to this shape.

The upper layer electrode (i) has an electrode width L of the linear portion of 3 µm and an electrode interval S1 between the adjacent linear portions of 6 µm. In addition, the electrode interval S2 is 16 µm. The electrode width L is preferably, for example, 2 µm or more and 7 µm or less. In addition, the electrode interval S1 is preferably, for example, 2 µm or more and 14 µm or less. The ratio of the electrode width L to the electrode interval S1 (L/S1) is preferably 0.1 to 1.5. A more preferable lower limit value of the ratio L/S1 is 0.2, and a more preferable upper limit value is 1.2.

As described above, each of the linear portions included in the upper layer electrode (i) is bent between the pixel central portion and each pixel end portion (two positions).

Figure 3:
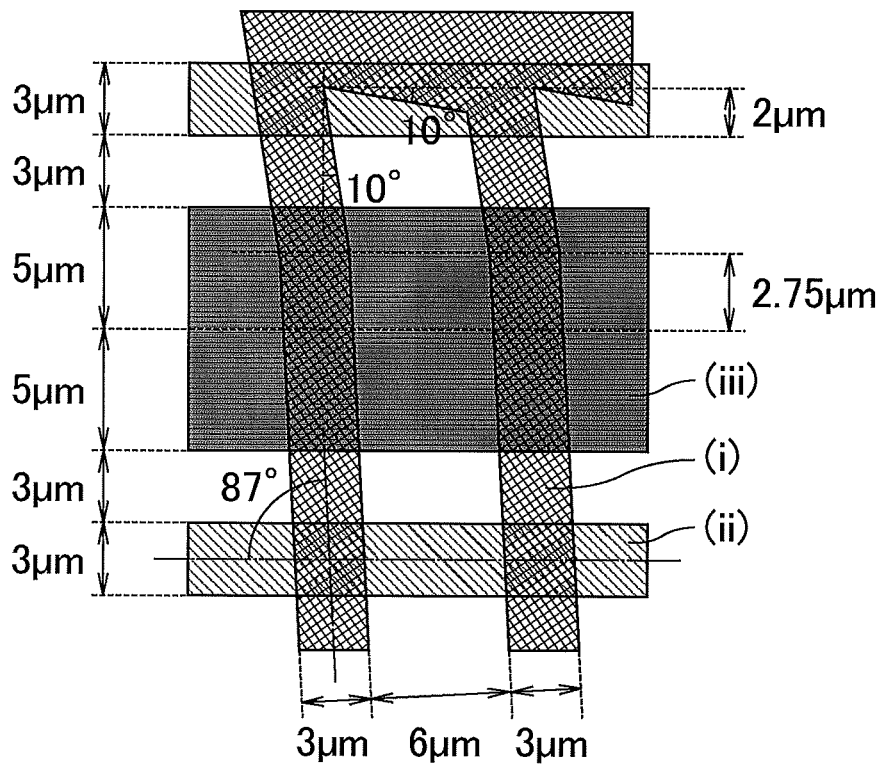
FIG. 3 is an enlarged schematic diagram showing an upper layer electrode (i), a lower layer electrode (ii), and a lower layer electrode (iii) of the liquid crystal display device of Example 1.

As shown in FIG. 3 described below, the extending direction of each branch portion of the lower layer electrode (ii) and the lower layer electrode (iii) is set to a direction forming 87° with respect to the extending direction of the pixel central portion of the linear portion of the upper layer electrode (i), and is set to a direction forming 80° with respect to the extending direction of each pixel end portion (each of the pixel upper end portion and the pixel lower end portion) of the linear portion of the upper layer electrode (i). In other words, when the extending direction of the linear portion being the branch portion of the two comb-shaped electrodes of the lower substrate is viewed in a plan view of the lower substrate, the two comb-shaped electrodes of the lower substrate are arranged so as to intersect with the extending direction of the pixel central portion of the linear portion of the upper layer electrode (i) at an angle of 87° and to intersect with the extending direction of each pixel end portion of the linear portion of the upper layer electrode (i) at an angle of 80°.

In addition, in FIG. 1, the branch portion of the lower layer electrode (ii) of the lower substrate is arranged between the branch portions of the lower layer electrode (iii).

Example 1 uses two linearly polarizing plates having polarization axes shown in FIG. 1. In Example 1, one linearly polarizing plate is disposed on the outer side of the upper and lower substrates (on the side opposite to the liquid crystal layer side). The arrangement of the linearly polarizing plate is a crossed Nicols arrangement in which the polarization axis of the linearly polarizing plate in the upper and lower substrates is perpendicular or parallel to the long axis of liquid crystal molecules when no voltage is applied (liquid crystal initial alignment orientation), thereby forming a normally black mode liquid crystal display device. Thus, each of the upper and lower substrates preferably includes a linearly polarizing plate.

The upper layer electrode (i) is electrically connected to the drain electrode extending from the thin-film transistor element TFT via the contact hole CH. At the timing selected by the gate bus line GL, the voltage supplied from the source driver via the source bus line SL is applied to the upper layer electrode (i) for driving the liquid crystal through the thin-film transistor element TFT.

Figure 2:
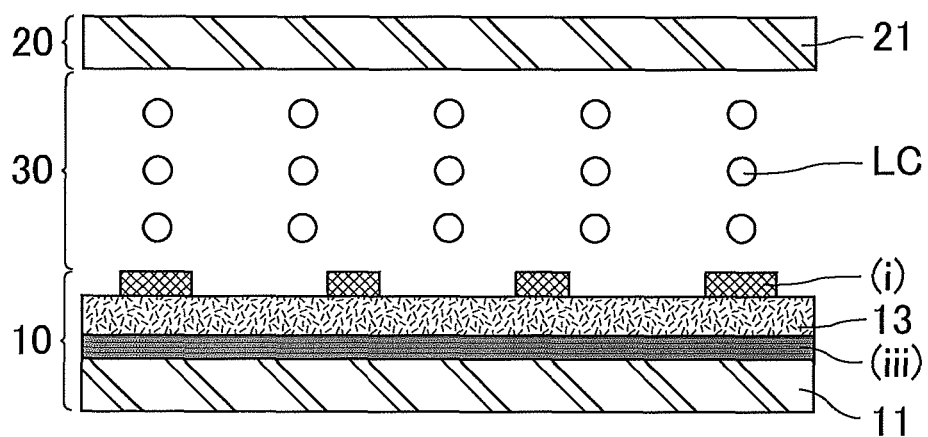
FIG. 2 is a schematic cross-sectional view showing a cross section of a portion corresponding to a line segment indicated by a chain line in FIG. 1.

FIG. 2 is a schematic cross-sectional view showing a cross section of a portion corresponding to a line segment indicated by a chain line in FIG. 1.

As shown in FIG. 2, the liquid crystal display device of Example 1 is formed with the lower substrate 10, the liquid crystal layer 30, and the upper substrate 20 laminated in this order from the back surface side toward the viewing screen side of the liquid crystal display device.

As shown in FIG. 2, the liquid crystal display device of Example 1 horizontally aligns the liquid crystal molecules LC when the potential difference between the respective electrodes of the upper and lower substrates is less than a threshold voltage (in FIG. 2, the liquid crystal molecules LC are aligned toward the front from the back of the cross section).

Each of the lower layer electrode (ii) (not shown in FIG. 2) and the lower layer electrode (iii) of the lower substrate 10 is a comb-shaped electrode as described above, and an upper layer electrode (i) being a slit electrode is arranged on the lower layer electrode (ii) and the lower layer electrode (iii) via the insulating layer 13. The upper substrate 20 is not provided with any electrode for liquid crystal driving, and only the lower substrate 10 is provided with the electrodes for liquid crystal driving.

The dielectric constant of the insulating layer 13 is 6.9, and the average thickness thereof is 0.3 µm. Each of the insulating layers 13 includes a nitride film SiN, but an oxide film $SiO_2$, an acrylic resin, or the like, or a combination of these materials can also be used instead.

Each of the liquid crystal layer side of the upper and lower substrates is provided with a horizontal alignment film (not shown), and the liquid crystal molecules were horizontally aligned so that the long axis of the liquid crystal molecules at the time of no voltage application forms an angle of 3° with the extending direction of the linear portion of the upper layer electrode (i). It should be noted that the liquid crystal layer and the upper layer electrode (i) are adjacent to each other via a horizontal alignment film. The horizontal alignment film is not limited as long as it makes liquid crystal molecules horizontally aligned with the film surface, and includes an alignment film formed from an organic material (for example, an alignment film with a dielectric constant c=3 to 4); an alignment film formed from an inorganic material (for example, an alignment film with a dielectric constant E=5 to 7); a photo-alignment film formed from a photoactive material; and an alignment film subjected to alignment treatment by rubbing treatment. It should be noted that using an alignment film not requiring alignment treatment, such as a photo-alignment film, allows cost to be reduced due to simplifying the process, and reliability and yield to be improved. In addition, when rubbing treatment is performed, there is a risk of occurrence of liquid crystal contamination due to contamination of impurities from rubbing cloth, occurrence of point defect failure due to foreign matter, occurrence of display unevenness due to nonuniform rubbing in the liquid crystal panel, and the like, but these disadvantages can also be eliminated.

As described above, the liquid crystal includes liquid crystal molecules aligned in the horizontal direction when no voltage is applied. It should be noted that "aligned in the horizontal direction" means that liquid crystal molecules are aligned in a direction substantially parallel to the main surface of the substrate in the technical field of the present invention, as long as they can exhibit optical actions and effects. It is preferable that the liquid crystal substantially includes liquid crystal molecules aligned in the horizontal direction when no voltage is applied. The above "when no voltage is applied" has only to be substantially no voltage being applied in the technical field of the present invention. Such a horizontal alignment liquid crystal is an advantageous system for obtaining characteristics such as a wide viewing angle.

The anisotropy of dielectric constant of the liquid crystal material in the liquid crystal layer 30 in the liquid crystal display device of Example 1 is positive (anisotropy of dielectric constant $\Delta\varepsilon=5.9$, viscosity (rotational viscosity) $\gamma1=89$ cps, refractive index anisotropy $\Delta n=0.109$, Re of panel=350 nm). As described above, it is one of preferred modes of the present invention that the liquid crystal layer contains liquid crystal molecules having positive anisotropy of dielectric constant. Liquid crystal molecules having positive anisotropy of dielectric constant are aligned in a certain direction when an electric field is applied, are easy to alignment-control, and can respond faster. The anisotropy of dielectric constant of the liquid crystal $\Delta\varepsilon$ is preferably 3 or more, more preferably 4 or more, and still more preferably 5 or more. In addition, the anisotropy of dielectric constant of the liquid crystal $\Delta\varepsilon$ is preferably 30 or less, more preferably 20 or less, and still more preferably 10 or less. Herein, the anisotropy of dielectric constant of the liquid crystal $\Delta\varepsilon$ means that measured with an LCR meter.

In Example 1, the average thickness of the liquid crystal layer 30 (cell gap) $d_{LC}$ is 3.2 µm.

Herein, the average thickness $d_{LC}$ of the liquid crystal layer means a value calculated by averaging the thickness of the entire liquid crystal layer in the liquid crystal display device.

$d_{LC} \times \Delta n$ is preferably 100 nm or more, more preferably 150 nm or more, and still more preferably 200 nm or more. In addition, $d_{LC} \times \Delta n$ is preferably 550 nm or less, more preferably 500 nm or less, and still more preferably 450 nm or less.

In the following, a method for driving a liquid crystal using the liquid crystal display device of the present Example will be described.

In the present Example, it is possible to achieve drive capable of high-speed response. In addition, switching the voltage application method allows two kinds of drive, drive capable of high speed response and drive achieving higher transmittance than the drive, to be achieved with the same configuration.

Herein, the drive capable of achieving high speed response is referred to as a first drive system, and the drive achieving higher transmittance is referred to as a second drive system.

Both the first drive system and the second drive system change the voltage of the upper layer electrode (i) to perform gray scale display.

In the first drive system, applying polarity reversed voltages with the amplitude center at 0 V so that the polarities of the lower layer electrode (ii) and the lower layer electrode (iii) are opposite to each other always generates a lateral electric field, and applying polarity reversed voltages corresponding to the gray scale to the upper layer electrode (i)

performs the drive. Here, the liquid crystal display device of Example 1 is configured to execute a driving operation in which the polarity of the voltage applied to the upper layer electrode (i) is the same as the polarity of the voltage applied to the lower layer electrode (ii) and different from the polarity of the voltage applied to the lower layer electrode (iii). In addition, the liquid crystal display device of Example 1 is configured to execute a driving operation in which the potential difference between the upper layer electrode (i) and the lower layer electrode (iii) is not less than the potential difference between the upper layer electrode (i) and the lower layer electrode (ii). The latter driving operation can be executed even when the polarity of the voltage applied to the upper layer electrode (i), the polarity of the voltage applied to the lower layer electrode (ii), and the polarity of the voltage applied to the lower layer electrode (iii) are the same. For example, a voltage may be symmetrically applied to the lower layer electrode (ii) and the lower layer electrode (iii) with an amplitude center of 6 V and an amplitude of 0 to 12 V centered on the amplitude center.

In the second drive system, both the lower layer electrode (ii) and the lower layer electrode (iii) are set to 0 V, and applying a voltage according to the gray scale to the upper layer electrode (i) with its polarity reversed generates a fringe electric field between the upper layer electrode (i) and the lower electrode (ii) and lower layer electrode (iii) to drive the liquid crystal. With the electrode structure according to the present invention, during the second drive system, in the region where no lower layer electrode is disposed in the vicinity of the pixel end (upper layer electrode end portion), the alignment disorder of the liquid crystal caused by the fact that the generated electric field is different from that of the pixel central portion can be sufficiently prevented and a high contrast ratio can be achieved.

FIG. 3 is an enlarged schematic diagram showing an upper layer electrode (i), a lower layer electrode (ii), and a lower layer electrode (iii) of the liquid crystal display device of Example 1. FIG. 3 shows a portion surrounded by a chain line in FIG. 1.

In FIG. 3, in one of multiple branch portions of the lower layer electrode (ii), a part thereof overlaps a trunk portion of the upper layer electrode (i), another part is in an opening of the first electrode, and the vertical distance A between the upper end and the lower end of the other part in the opening is 2 µm. In addition, each of the branch portions included in the first electrode is bent, and the distance B between the bending point and the center line between the upper and lower ends of the branch portion of the third electrode is 2.75 µm. Furthermore, the angle C formed by an extending direction of the branch portion of the second electrode and an extending direction of a lower edge on the one side of the trunk portion of the first electrode is 10°. Then, the angle D between an extending direction of the trunk portion of the second electrode (not shown in FIG. 3) and an extending direction of the upper side portion from the bending point of the branch portion of the first electrode is 10°. As described below, adopting this electrode shape makes the alignment stability of the liquid crystal excellent in the second drive system.

In FIG. 3, the electrode width of the branch portion of the lower layer electrode (ii) is 3 µm, the electrode width of the branch portion of the lower layer electrode (iii) is 10 µm, and the electrode interval between the branch portion of the lower layer electrode (ii) and the branch portion of the lower layer electrode (iii) is 3 µm.

In Example 1 and its modified example, the average width of the branch portion of the lower layer electrode (iii) is larger than the average width of the branch portion of the lower layer electrode (ii), which is one of preferred modes of the present invention. This makes it possible to prevent black floating in the first drive system to improve the contrast ratio.

The average electrode width in the branch portion of the lower layer electrode (ii) is preferably 2.5 µm or more and 4.5 µm or less. In addition, the average electrode width in the branch portion of the lower layer electrode (iii) is preferably 5.5 µm or more, and preferably 13 µm or less. Furthermore, the average electrode interval between the branch portion of the lower layer electrode (ii) and the branch portion of the lower layer electrode (iii) is preferably 2.5 µm or more, and preferably 4.5 µm or less. It should be noted that each of the average electrode width of the lower layer electrode (ii), the average electrode width of the lower layer electrode (iii), and the average electrode interval between the branch portion of the lower layer electrode (ii) and the branch portion of the lower layer electrode (iii) adjacent to each other is an average value in the pixel.

Figure 4:
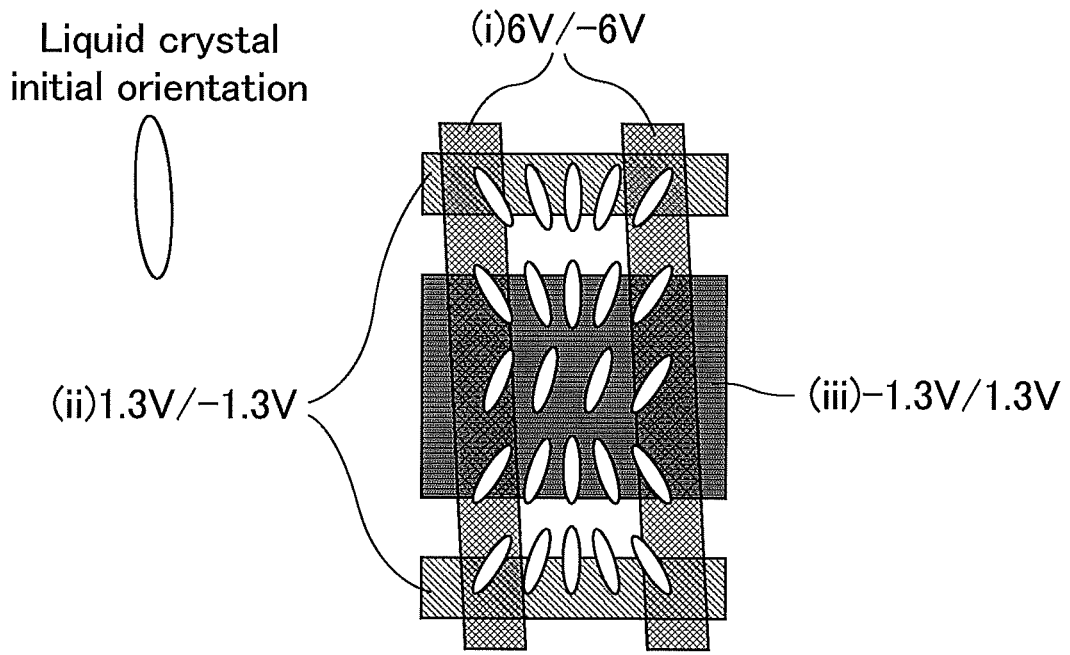
FIG. 4 is a schematic plan view showing the voltage applied to each electrode and the alignment of liquid crystal molecules during white display of the first drive system of Example 1.
Figure 5:
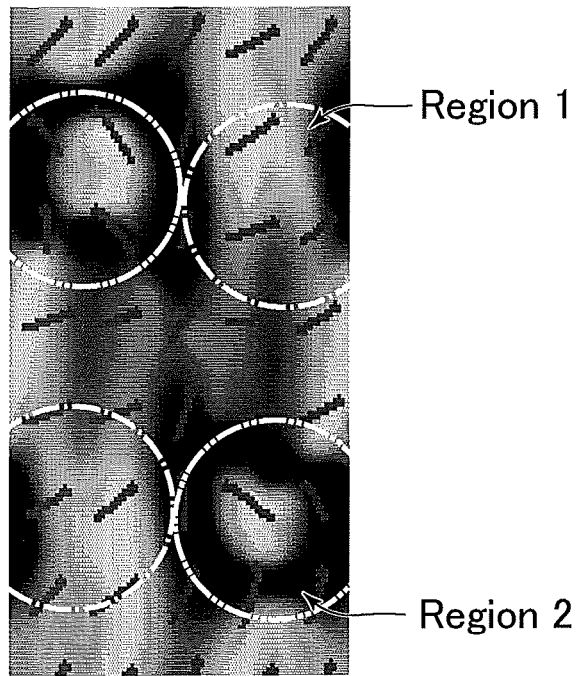
FIG. 5 is a simulation result showing director distribution and transmittance distribution corresponding to FIG. 4.
Figure 6:
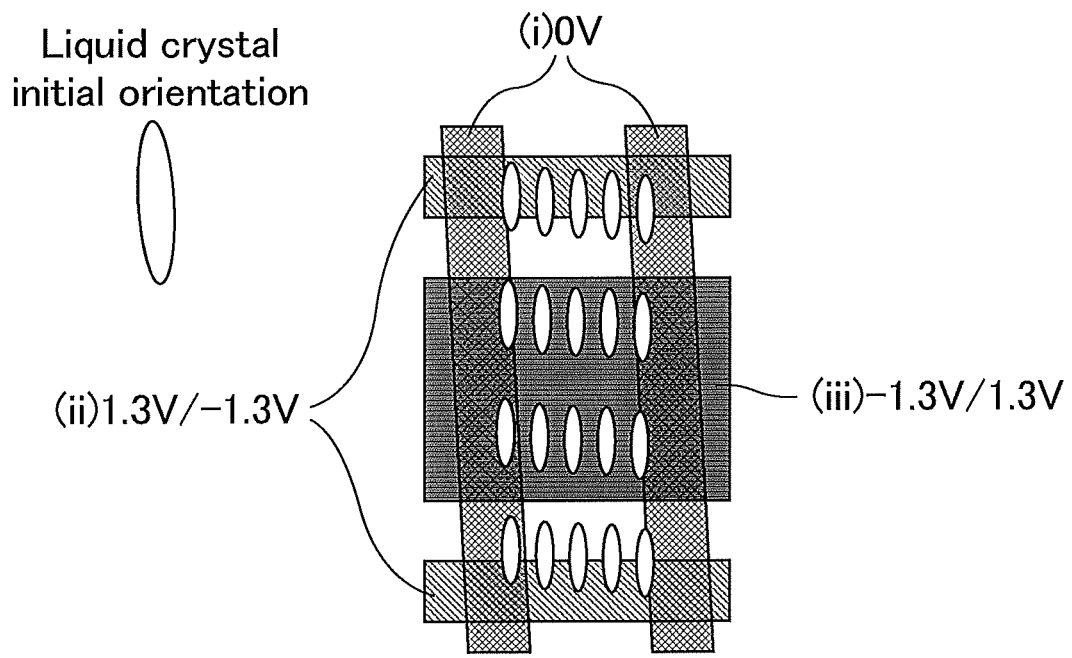
FIG. 6 is a schematic plan view showing the voltage applied to each electrode and the alignment of liquid crystal molecules during black display of the first drive system of Example 1.
Figure 7:
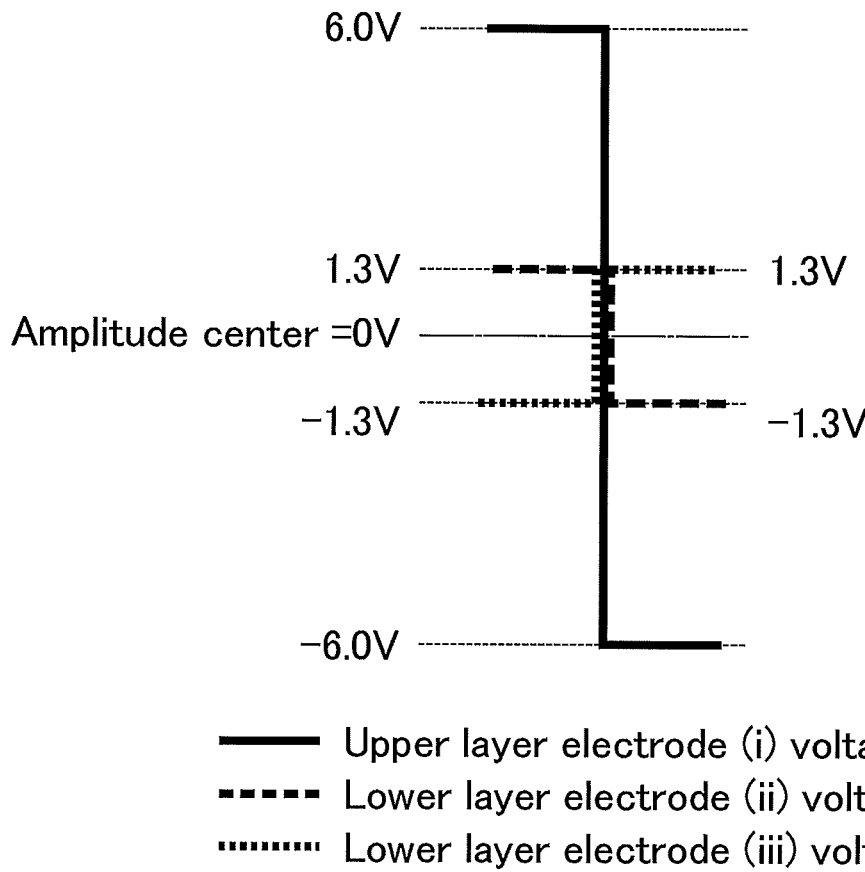
FIG. 7 is a voltage relationship diagram showing voltages applied to the respective electrodes during white display of the first drive system of Example 1.

FIG. 4 is a schematic plan view showing the voltage applied to each electrode and the alignment of liquid crystal molecules during white display of the first drive system of Example 1. FIG. 5 is a simulation result showing director distribution and transmittance distribution corresponding to FIG. 4. FIG. 6 is a schematic plan view showing the voltage applied to each electrode and the alignment of liquid crystal molecules during black display of the first drive system of Example 1. FIG. 7 is a voltage relationship diagram showing voltages applied to the respective electrodes during white display of the first drive system of Example 1. Each of FIGS. 4 to 7 shows a portion corresponding to a portion surrounded by a broken line in FIG. 1.

First, the operation of liquid crystal molecules during the rise time will be described in detail. As shown in FIGS. 4 and 7, voltages are always applied to the lower layer electrode (ii) and the lower layer electrode (iii) with the amplitude center set to 0 V and the polarity reversed so that the polarities are opposite to each other to always generate the lateral electric field. It should be noted that the absolute values of the voltages applied to the lower layer electrode (ii) and the lower layer electrode (iii) are always constant. Moreover, applying a voltage to the upper layer electrode (i) with the polarity reversed so that the polarity is the same as the polarity of the voltage applied to the lower layer electrode (ii) generates an electric field to rotate the liquid crystal molecules alternately in different orientations in the horizontal plane, and the electric field causes the liquid crystal molecules to be aligned in such a manner as to exhibit bend alignment and splay alignment in the horizontal plane. In the first drive system of the present Example, during white gray scale display, 6 V/−6 V is applied to the upper layer electrode (i), 1.3 V/−1.3 V is applied to the lower layer electrode (ii), and −1.3 V/1.3 V is applied to the lower layer electrode (iii). In the liquid crystal display device of Example 1, since the average width of the lower layer electrode (iii) is wider than the average width of the lower layer electrode (ii), the stability of the alignment of the liquid crystal molecules can be maintained even when the voltages applied to the lower layer electrode (ii) and the lower layer electrode (iii) are reduced, so that it is possible to reduce the voltages applied to the lower layer electrode (ii) and the lower layer electrode (iii) in order to reduce black floating.

As can be seen from the transmittance distribution diagram by simulation (FIG. 5), it can be seen that the liquid crystal molecules rotate in different orientations in the region 1 surrounded by the one-dot chain line and the region 2 surrounded by the two-dot chain line, and the region 1 and the region 2 exist alternately. That is, in the first drive system, the liquid crystal molecules alternately rotate in different orientations in the horizontal plane. In the region 1 (the first region) shown in FIG. 5, the liquid crystal molecules rotate clockwise in the horizontal plane and in the region 2 (the second region), the liquid crystal molecules rotate counterclockwise in the horizontal plane. In other words, when the lower substrate is viewed in a plan view, between the linear electrodes of the upper layer electrode (i) (within the region overlapping with the slit of the upper layer electrode (i)), between the linear electrodes being the branch portions of the lower layer electrode (ii), and between the linear electrodes which are the branch portions of the lower layer electrode (iii), the liquid crystal molecules rotate in two different directions rather than rotating in one direction in the horizontal plane.

In addition, always applying voltages to the lower layer electrode (ii) and the lower layer electrode (iii) so as to generate a lateral electric field between the lower layer electrode (ii) and the lower layer electrode (iii) applies a strong electric field to the whole region in the horizontal plane during the rise response. Therefore, the rise response is speeded up.

Next, the operation of liquid crystal molecules during the falling time will be described.

In the first drive system, since voltages are always applied to the lower layer electrode (ii) and the lower layer electrode (iii) also during the decay response, when the voltage of the upper layer electrode (i) is weakened or reduced to zero, the liquid crystal molecules are forcibly rotated in a direction in which the liquid crystal molecules return to the initial alignment due to the lateral electric field generated between the lower layer electrode (ii) and the lower layer electrode (iii). Furthermore, in the case of the first drive system, bend alignment and splay alignment occur in the horizontal plane, and a large restoring force also works due to elastic strain induced thereby. Therefore, the decay response is also speeded up. As shown in FIG. 6, in the first drive system of the present Example, during black gray scale display, 0 V is applied to the upper layer electrode (i), 1.3 V/−1.3 V is applied to the lower layer electrode (ii), and −1.3 V/1.3 V is applied to the lower layer electrode (iii). It should be noted that in the first drive system, at least two regions in which liquid crystal molecules rotate in different orientations in a plane continuously exist alternately. Thus, it is preferable that two or more regions in which the liquid crystal molecules rotate in different orientations continuously exist in a plane.

As described above, in FIG. 6, the potential of the upper layer electrode (i) is set as 0 V. Thus, except when the voltage of the pixel electrode (the upper layer electrode (i) in Example 1) is weakened or reduced to zero from the voltage during the maximum transmittance, the potentials of the other electrodes (the lower layer electrode (ii) and the lower layer electrode (iii) in Example 1) and the like can be the same as those during white display in the first drive system, and the preferable ranges and the like are also the same as those during white display in the first drive system. For example, in Example 1, during both white display and black display, the lower layer electrode (ii) of the lower substrate is 1.3 V/−1.3 V, and the lower layer electrode (iii) is −1.3 V/1.3 V. As described above, in the liquid crystal display device of the present invention, it is preferable that the lower layer electrode (ii) and the lower layer electrode (iii) of the lower substrate have absolute values of constant voltages during both white display and black display.

The method for applying a voltage to each electrode in the above-described first drive system includes: changing a voltage to be applied to the upper layer electrode (i) being a pixel electrode, and applying respective voltages of a predetermined magnitude to the lower layer electrode (ii) and the lower layer electrode (iii); and this method for applying a voltage is one of preferable modes in the liquid crystal display device of the present invention.

Figure 8:
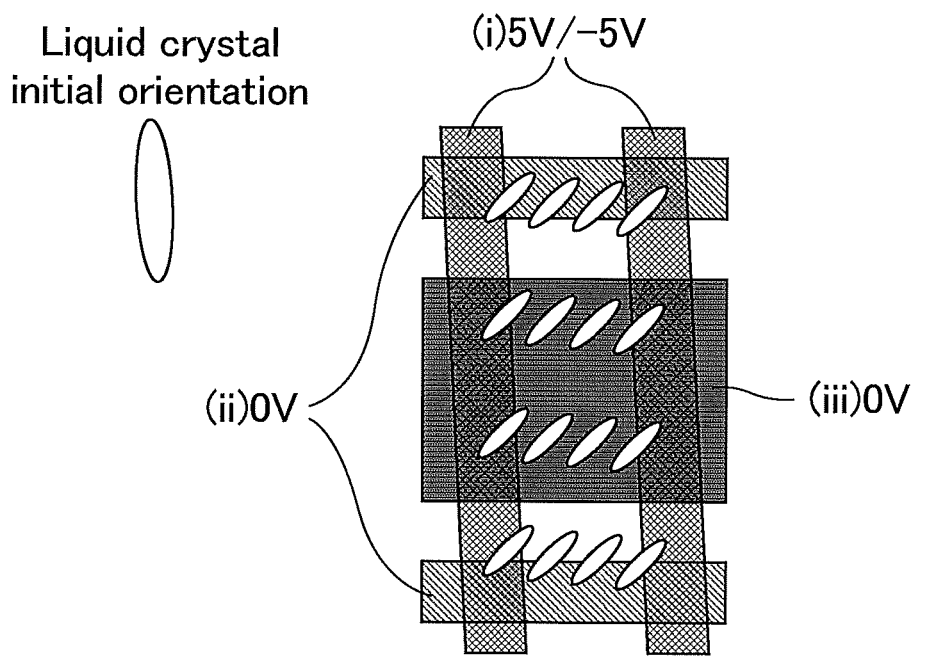
FIG. 8 is a schematic plan view showing the voltage applied to each electrode and the alignment of liquid crystal molecules during white display of the second drive system of Example 1.
Figure 9:
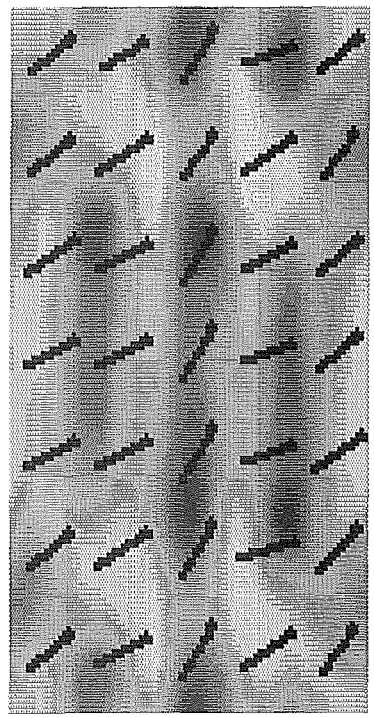
FIG. 9 is a simulation result showing director distribution and transmittance distribution corresponding to FIG. 8.
Figure 10:
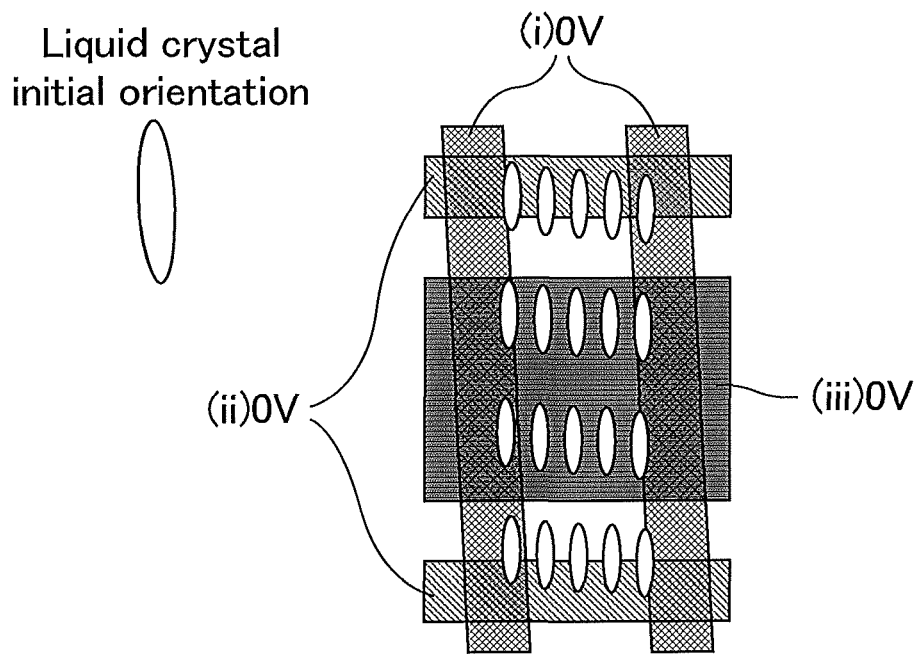
FIG. 10 is a schematic plan view showing the voltage applied to each electrode and the alignment of liquid crystal molecules during black display of the second drive system of Example 1.

FIG. 8 is a schematic plan view showing the voltage applied to each electrode and the alignment of liquid crystal molecules during white display of the second drive system of Example 1. FIG. 9 is a simulation result showing director distribution and transmittance distribution corresponding to FIG. 8. FIG. 10 is a schematic plan view showing the voltage applied to each electrode and the alignment of liquid crystal molecules during black display of the second drive system of Example 1.

Each of FIGS. 8 to 10 shows the portion corresponding to a portion surrounded by the linear portions of the upper layer electrode (i) and the branch portions of the lower layer electrode (ii) in FIG. 1.

First, the operation of liquid crystal molecules during the rise time will be described in detail.

As shown in FIG. 8, setting both the lower layer electrode (ii) and the lower layer electrode (iii) to 0 V and applying a voltage to the upper layer electrode (i) with the polarity reversed generates a fringe electric field between the upper layer electrode (i) and the lower layer electrode (ii) and lower layer electrode (iii) to rotate the liquid crystal molecules in the same orientation in response to the electric field. In the second drive system of the present Example, 5 V/−5 V is applied to the upper layer electrode (i) during white gray scale display. As can be seen from the transmittance distribution diagram by simulation (FIG. 9), rotating the liquid crystal molecules in the same orientation obtains higher transmittance as a whole than the transmittance in the first drive system.

During white display in the second drive system, the voltage of the upper layer electrode (i) changes according to the display, and the upper limit thereof is preferably 10 V, more preferably 8 V, and still more preferably 7 V.

Next, the operation of liquid crystal molecules during the falling time will be described.

As shown in FIG. 10, turning off the voltage applied to the upper layer electrode (i) rotates the liquid crystal molecules so as to return toward the alignment treatment orientation (anchoring) by the restoring force of the liquid crystal molecules. In the second drive system of the present Example, the voltage applied to the upper layer electrode (i) during black display is 0 V. The voltages applied to the other electrodes (the lower layer electrode (ii) and the lower layer electrode (iii)) are the same as those during white display of the second drive system, and are 0 V. It should be noted that during black display of the second drive system, the voltages applied to the upper layer electrode (i), the lower layer electrode (ii), and the lower layer electrode (iii) have only to be less than the threshold voltages.

In Example 1, since the voltages to be applied to the lower layer electrode (ii) and the lower layer electrode (iii) are different between the first drive system and the second drive system, for example, scan drive is performed for each line (gate bus line or the like).

It should be noted that a thin-film transistor element including an oxide semiconductor is preferably used for the thin-film transistor element in the liquid crystal display device of Example 1 from the viewpoint of transmittance improvement effect. The oxide semiconductor shows higher carrier mobility than amorphous silicon. Thus, since the area occupied by transistors in one pixel can be reduced, the aperture ratio is increased, and the light transmittance per pixel can be increased. Therefore, using a thin-film transistor element including an oxide semiconductor allows the contrast ratio improvement effect being an effect of the present invention to be more remarkably obtained. That is, in the liquid crystal display device of the present invention, it is preferable that the lower substrate includes a thin-film transistor element, and the thin-film transistor element includes an oxide semiconductor.

The liquid crystal display device of Example 1 can be applied to any of transmissive, reflective, and transflective liquid crystal display devices. The same also applies to Examples described below.

The upper and lower substrates included in the liquid crystal display device of Example 1 are a pair of substrates for sandwiching the liquid crystal, and are formed by building lines, electrodes, color filters, and the like as necessary onto the insulating substrate made of, for example, glass, resin, or the like as a base material.

It should be noted that the liquid crystal display device of Example 1 can appropriately include members included in a normal liquid crystal display device (for example, a light source or the like). In addition, the liquid crystal display device of Example 1 preferably drives the liquid crystal with an active matrix drive system. The same also applies to Examples described below.

Figure 11:
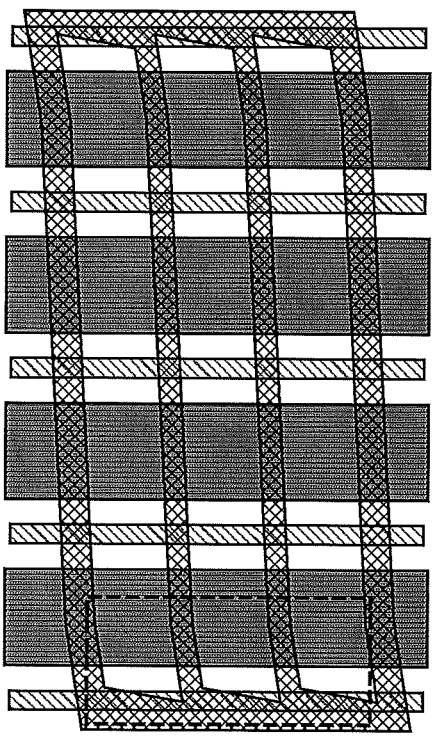
FIG. 11 is a schematic plan view showing an upper layer electrode and lower layer electrodes of a liquid crystal display device.
Figure 12:
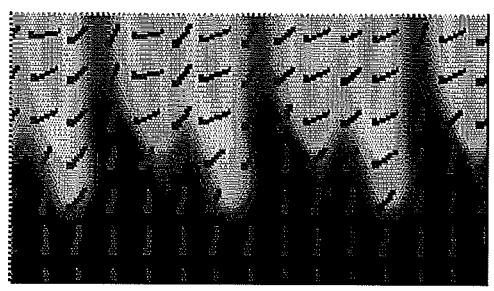
FIG. 12 is a simulation result showing director distribution and transmittance distribution corresponding to a portion surrounded by a broken line in FIG. 11 in Example 1.
Figure 13:
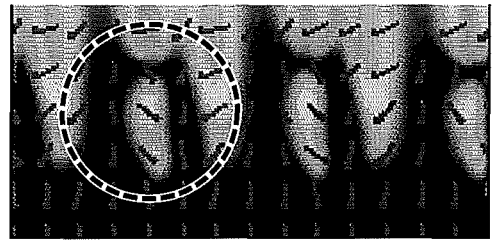
FIG. 13 is a simulation result showing director distribution and transmittance distribution corresponding to the same portion as in FIG. 12 in Comparative Example 1.
Figure 14:
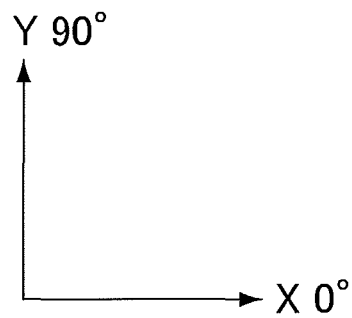
FIG. 14 is a schematic diagram showing the liquid crystal initial orientation and the liquid crystal orientation during white display.
Figure 14:
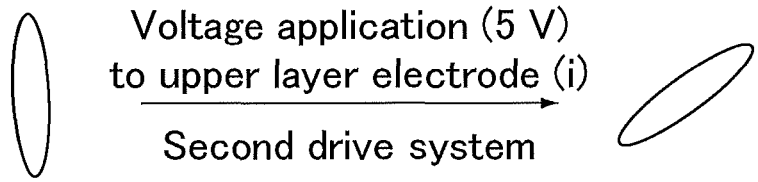

FIG. 11 is a schematic plan view showing an upper layer electrode and lower layer electrodes of a liquid crystal display device. It should be noted that FIG. 11 is an example, and the electrode structure is not limited to this shape. FIG. 12 is a simulation result showing director distribution and transmittance distribution corresponding to a portion surrounded by a broken line in FIG. 11 in Example 1. FIG. 13 is a simulation result showing director distribution and transmittance distribution corresponding to the same portion as in FIG. 12 in Comparative Example 1. Comparative example 1 will be described below. FIG. 14 is a schematic diagram showing the liquid crystal initial orientation and the liquid crystal orientation during white display. As the number of liquid crystals close to the desired rotation angle during white display increases, the SN ratio increases, which means stable alignment.

Each of Example 1 and Comparative Example 1 shows the transmittance distribution of the second drive system when 5 V is applied to the upper layer electrode (i). In Example 1, molecules rotate in the same orientation or maintain the initial alignment state in the region, but in Comparative Example 1, some of the liquid crystal molecules at the pixel end rotate in the opposite orientation, and alignment disorder occurs in a portion surrounded by a broken line.

The alignment state of the pixel end portion during white display (during application of 5 V) of the second drive system was evaluated with the following index.

Assuming that the interface between the alignment film of the lower substrate and the liquid crystal layer is $Z=0$, the rotation angle of liquid crystal molecules on the X-Y plane at $Z=0.66$ μm is $\Phi$, the number of extraction is n, the total square sum of the rotation angle $\Phi$ is Sn $$Sn = \Phi_1^2 + \Phi_2^2 + \ldots + \Phi_n^2,$$

the average effect of the rotation angle $\Phi$ is Sm $$Sm = (\Phi_1 + \Phi_2 + \ldots + \Phi_n)^2/n,$$

the error variation is Se $$Se = Sn - Sm, \text{ and}$$

the error variance is Ve $$Ve = Se/(n-1),$$

then, the SN ratio is expressed as $$SN \text{ ratio (dB)} = 10 \log((Sm - Ve)/Ve/n).$$

As can be understood from the formula, the larger the SN ratio is, the smaller the variation of the rotation angle of the liquid crystal is, that is, it can be understood that the liquid crystal molecules at the pixel end rotate in the same orientation and the alignment is stable.

The SN ratio in the second drive system of each of Example 1 and Comparative Example 1 during the application of 5 V (during white display) is shown in the following Table 1.

TABLE 1

|  | SN RATIO (dB) |
| --- | --- |
| EXAMPLE 1 | 0.59 |
| COMPARATIVE EXAMPLE 1 | −8.93 |

From the results in Table 1, it can be understood that the SN ratio of Example 1 is higher than the SN ratio of Comparative Example 1, and the alignment of Example 1 is more stable than the alignment of Comparative Example 1.

Figure 15:
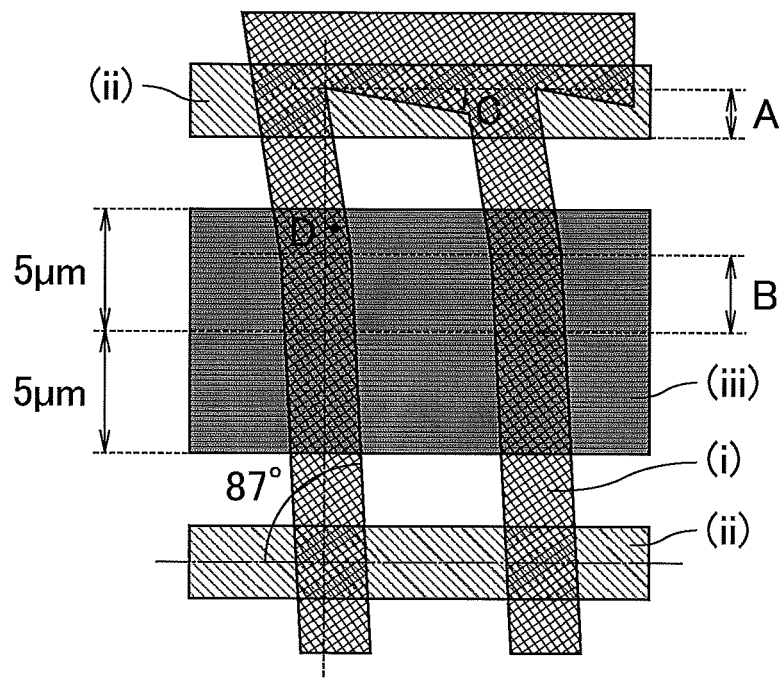
FIG. 15 is a schematic plan view showing each electrode structure at the pixel end portion of Example 1.
Figure 16:
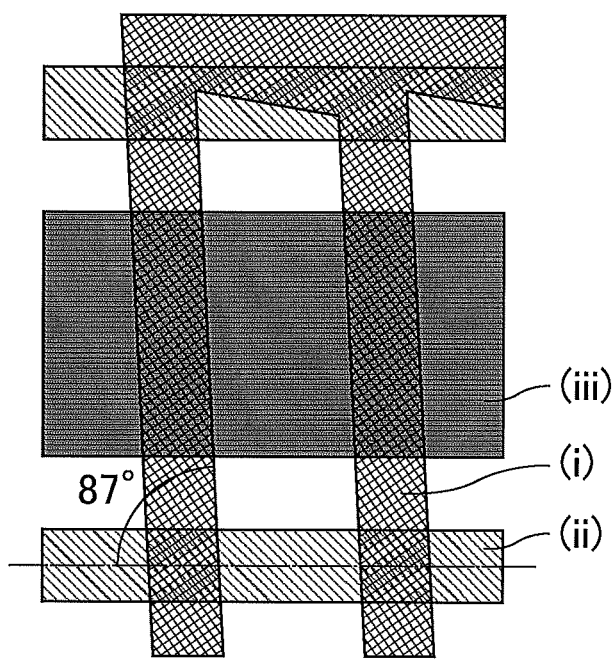
FIG. 16 is a schematic plan view showing each electrode structure at the pixel end portion of Comparative Example 1.

FIG. 15 is a schematic plan view showing each electrode structure at the pixel end portion of Example 1. FIG. 15 shows a portion surrounded by a one-dot chain line in FIG. 1. FIG. 16 is a schematic plan view showing each electrode structure at the pixel end portion of Comparative Example 1.

As shown in FIG. 15, in one of multiple branch portions of the lower layer electrode (ii), a part thereof overlaps the trunk portion of the upper layer electrode (i), and the other part is in the opening of the upper layer electrode (i). The vertical distance between the upper end of the other part in the opening and the lower end is defined as A. In addition, each of the branch portions included in the upper layer electrode (i) is bent. B is defined as the distance between the bending point and the center line between the upper and lower ends of the branch portion of the lower layer electrode (iii). Furthermore, C is defined as the angle formed between the extending direction of the branch portion of the lower layer electrode (ii) and the extending direction of the edge on the one side of the trunk portion of the upper layer electrode (i) (edge on the side where the branch portion branches). Then, D is defined as the angle formed by the extending direction of the trunk portion (not shown in FIG. 15) of the lower layer electrode (ii) and the extending direction of the upper side portion from the bending point of the branch portion of the upper layer electrode (i).

The values of A to D of Example 1 and Comparative Example 1 are shown in Table 2 below.

TABLE 2

|  | A [μm] | B [μm] | C [°] | D [°] |
|---|---|---|---|---|
| EXAMPLE 1 | 2 | 2.75 | 10 | 10 |
| COMPARATIVE EXAMPLE 1 | 2 | — | 10 | 3 |

As shown in Table 2, Comparative Example 1 and Example 1 differ only in the structure of the upper layer electrode (i). That is, D of Comparative Example 1 is 3°. In Comparative Example 1, the branch portions included in the upper layer electrode (i) are not bent, and the extending direction thereof is the same as the extending direction of the pixel central portion of the branch portion of the upper layer electrode (i) in Example 1 (the extending direction of the portion lower than the bending point).

Changing the values of A to D caused the alignment stability of the pixel end of the second drive system to be verified by using simulation.

Table 3 below shows the A to D and the SN ratio at the pixel end. In Examples 2 to 9 and Comparative Examples 1 to 5, the condition of one place of A to D is changed from the basic shape of Example 1.

TABLE 3

|  | A [μm] | B [μm] | C [°] | D [°] | PIXEL END SN RATIO [dB] |
|---|---|---|---|---|---|
| EXAMPLE 1 | 2 | 2.75 | 10 | 10 | 0.59 |
| COMPARATIVE EXAMPLE 2 | -2 | 2.75 | 10 | 10 | -5.42 |
| COMPARATIVE EXAMPLE 3 | 0 | 2.75 | 10 | 10 | -4.81 |
| COMPARATIVE EXAMPLE 4 | 1 | 2.75 | 10 | 10 | -2.65 |
| EXAMPLE 2 | 3 | 2.75 | 10 | 10 | 2.45 |
| EXAMPLE 3 | 2 | 0 | 10 | 10 | 0.64 |
| EXAMPLE 4 | 2 | 5 | 10 | 10 | 0.07 |
| EXAMPLE 5 | 2 | 5.1 | 10 | 10 | -0.81 |
| COMPARATIVE EXAMPLE 5 | 2 | 5.2 | 10 | 10 | -4.14 |
| EXAMPLE 6 | 2 | 2.75 | 0 | 10 | 0.87 |
| EXAMPLE 7 | 2 | 2.75 | 20 | 10 | -1.11 |
| COMPARATIVE EXAMPLE 1 | 2 | — | 10 | 3 | -8.93 |
| EXAMPLE 8 | 2 | 2.75 | 10 | 7 | 0.05 |
| EXAMPLE 9 | 2 | 2.75 | 10 | 20 | 0.9 |

Figure 17:
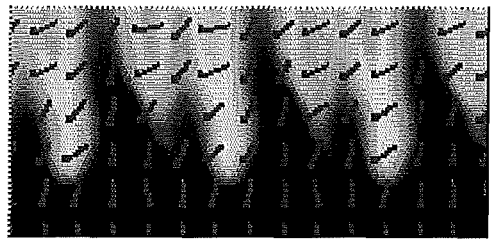
FIG. 17 is a simulation result showing director distribution and transmittance distribution in Example 6.
Figure 18:
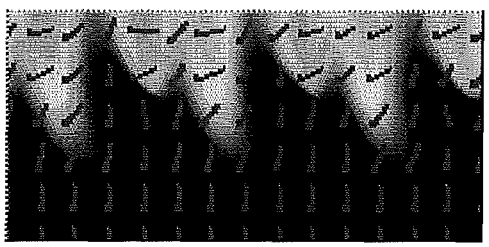
FIG. 18 is a simulation result showing director distribution and transmittance distribution in Example 7.
Figure 19:
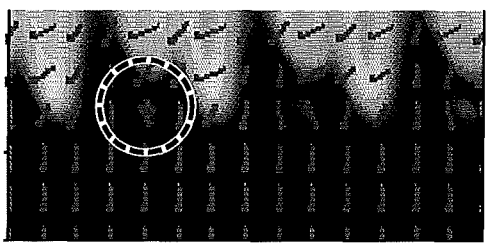
FIG. 19 is a simulation result showing director distribution and transmittance distribution in Comparative Example 3.
Figure 20:
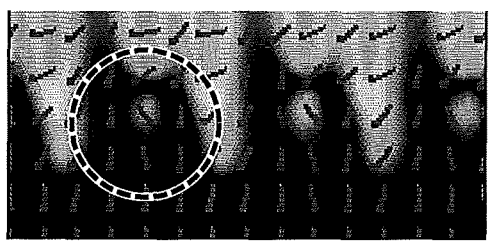
FIG. 20 is a simulation result showing director distribution and transmittance distribution in Comparative Example 5.

FIGS. 17 and 18 are respectively simulation results showing the director distribution and the transmittance distribution in Examples 6 and 7. FIGS. 19 and 20 are respectively simulation results showing the director distribution and the transmittance distribution in Comparative Examples 3 and 5.

Figure 21:
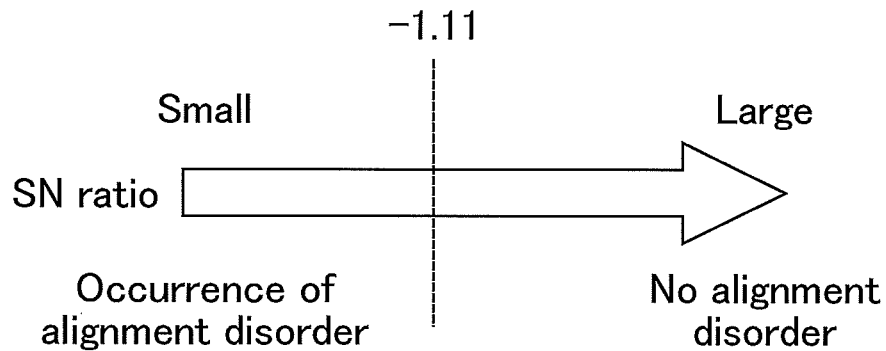
FIG. 21 is a schematic diagram showing the relationship between the magnitude of the SN ratio and the presence or absence of alignment disorder.

FIG. 21 is a schematic diagram showing the relationship between the magnitude of the SN ratio and the presence or absence of alignment disorder. The larger the SN ratio is, the more stable the alignment is, and when the SN ratio is not less than −1.11, the alignment disorder disappears.

When evaluation is made from the transmittance distribution based on the occurrence or non-occurrence of alignment disorder at the pixel end, in Example 1, Example 6, and Example 7, alignment disorder is not observed, whereas in Comparative Example 1, Comparative Example 3, and Comparative Example 5, alignment disorder occurs, so that the shape at the pixel end is not appropriate. When comparison is made together with the SN ratio, it can be seen that the SN ratios of Example 1, Example 6, and Example 7 are higher than the SN ratio of Comparative Example 1, no alignment disorder is observed also from the transmittance distribution, and the alignment is stable. However, in Comparative Examples 2 to 5, the SN ratio has a higher value than the SN ratio in Comparative Example 1, but alignment disorder occurs, so that it cannot be said that the alignment is sufficiently stable. The shape where the SN ratio is low and alignment disorder does not occur (there is no region where the liquid crystal molecules rotate in the reverse orientation) falls within Example 7, and it is considered that alignment is stable when the SN ratio is −1.11 or more (the higher the SN ratio is, the more stable the alignment is).

FIGS. 22 to 25 show the relationship between the above A to D and the pixel end SN ratio of the second drive system, in which Table 3 is graphed. FIGS. 22 to 25 are also graphs when the condition in any one place of the A to D is changed with Example 1 as a base shape in the same manner as in Table 3.

Figure 22:
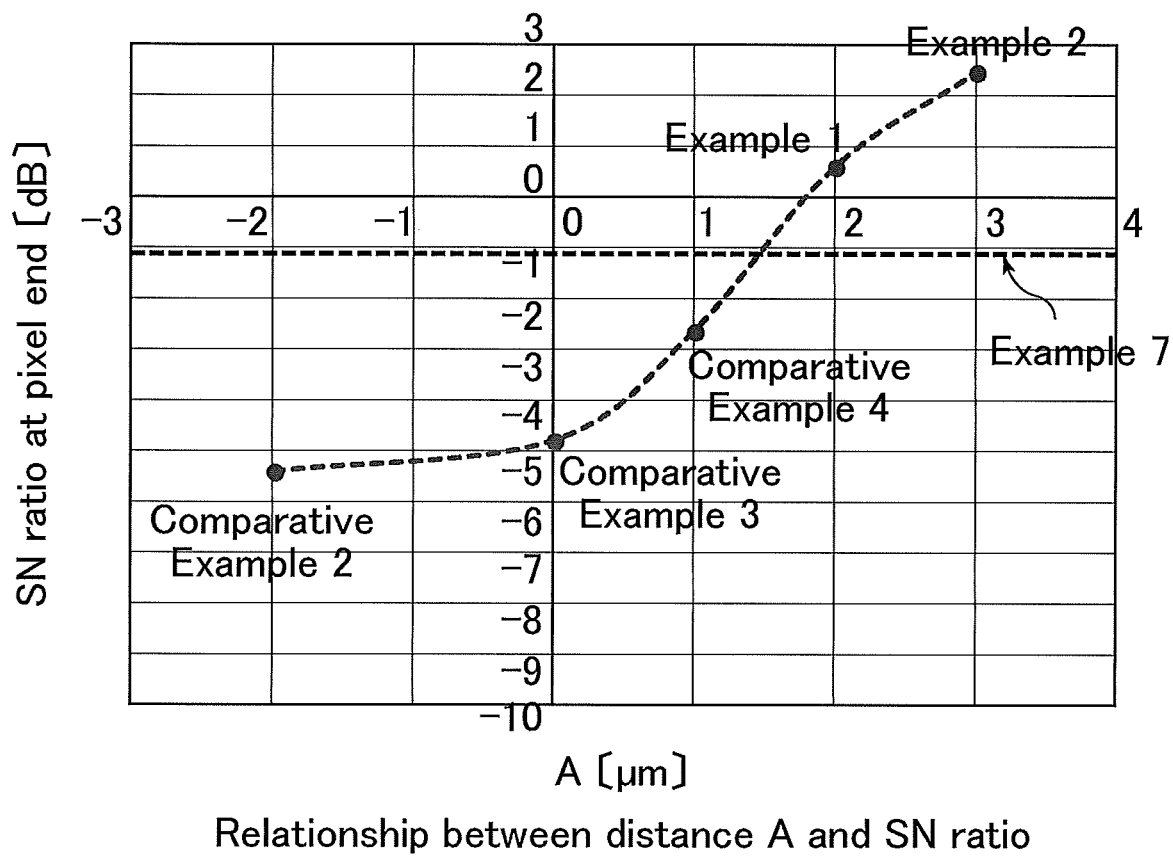
FIG. 22 is a graph showing the relationship between the distance A and the SN ratio.
Figure 23:
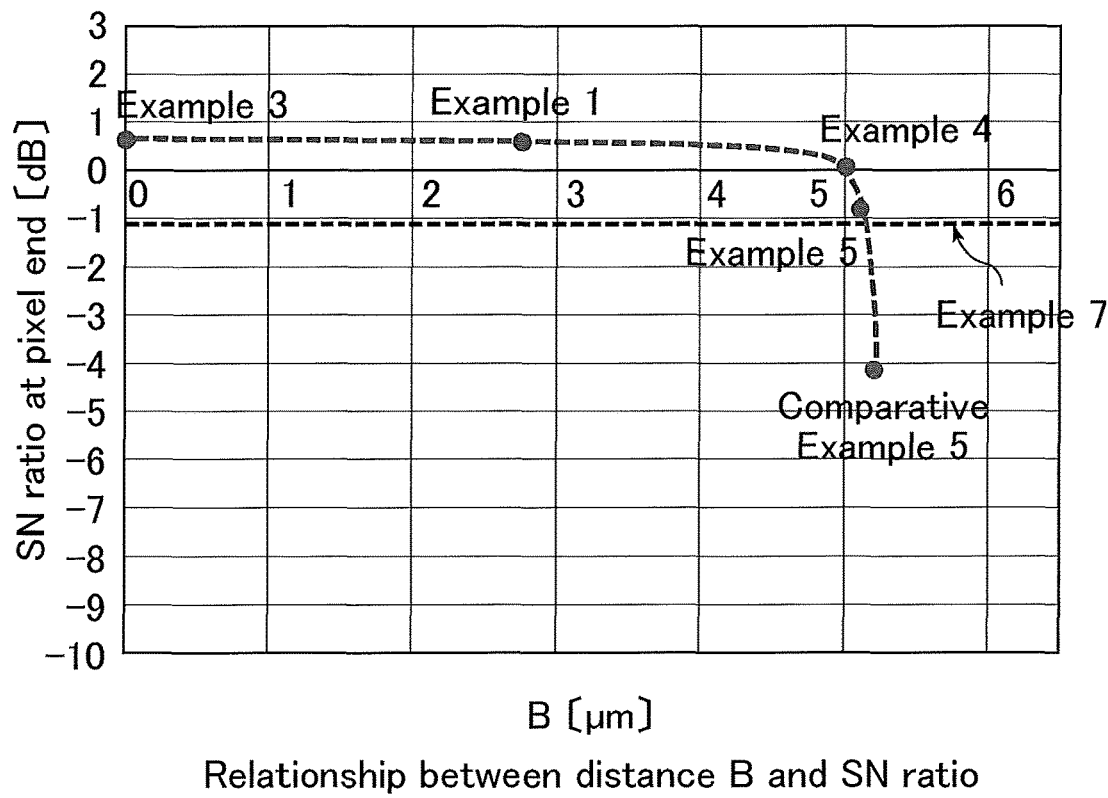
FIG. 23 is a graph showing the relationship between the distance B and the SN ratio.
Figure 24:
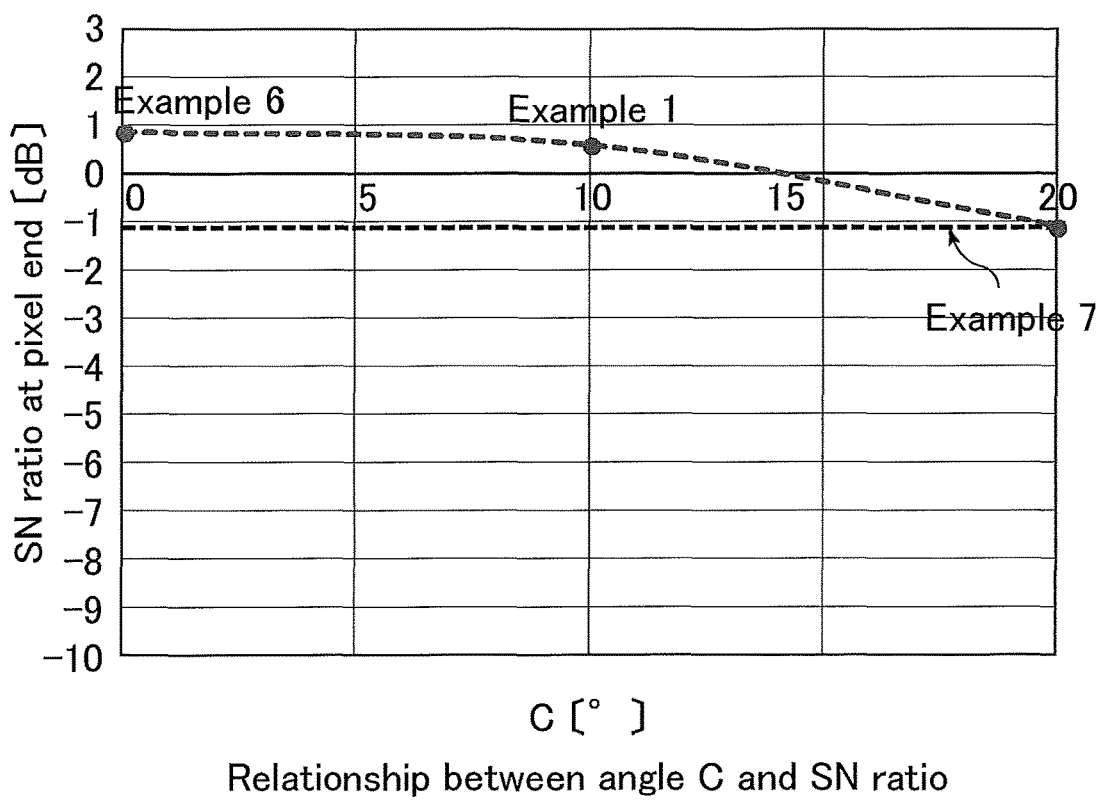
FIG. 24 is a graph showing the relationship between the angle C and the SN ratio.
Figure 25:
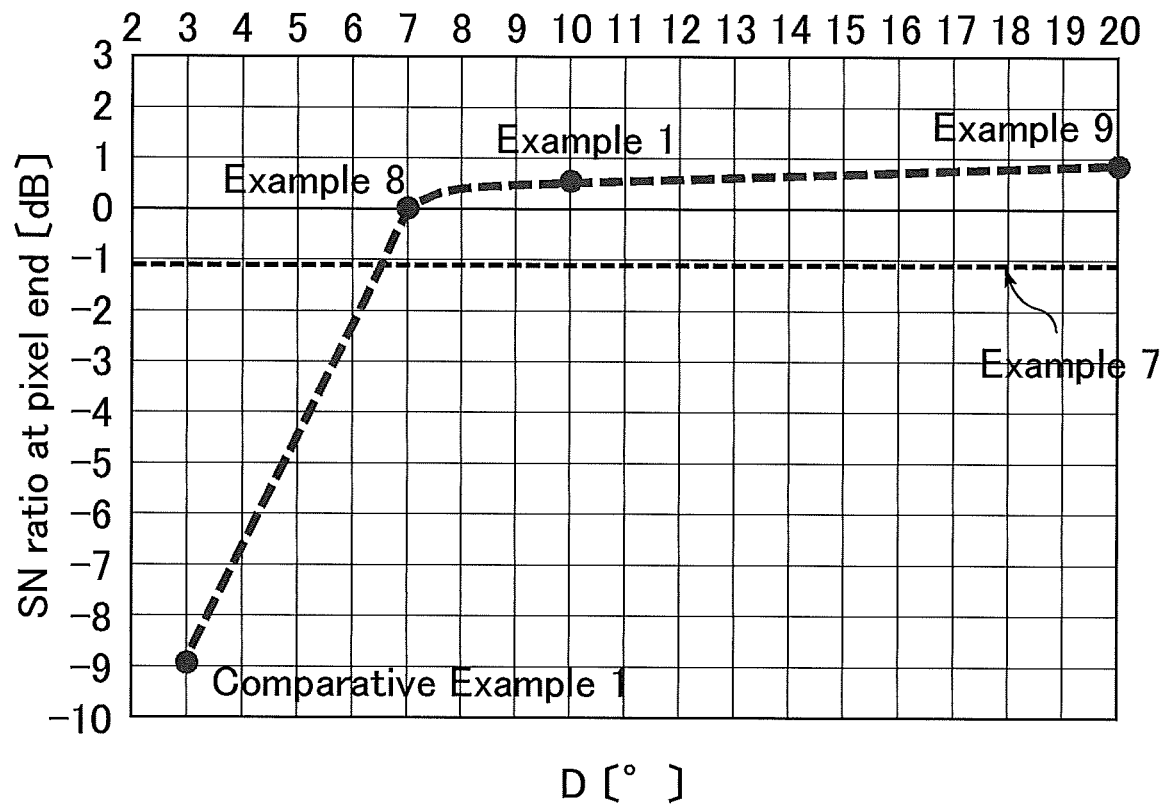
FIG. 25 is a graph showing the relationship between the angle D and the SN ratio.

FIG. 22 is a graph showing the relationship between the distance A and the SN ratio. FIG. 23 is a graph showing the relationship between the distance B and the SN ratio. FIG. 24 is a graph showing the relationship between the angle C and the SN ratio. FIG. 25 is a graph showing the relationship between the angle D and the SN ratio.

From the region where the SN ratio is not less than the SN ratio of −1.11 in Example 7, and from the relationship between the A to D and the pixel end SN ratio of the second drive system shown in FIGS. 22 to 25, each range of A to D showing excellent alignment stability is, A≥1.5 μm, 0 μm≤B≤5.1 μm, 0°≤C≤20°, and 6.5°≤D≤25°.

From the relationship between the distance A and the SN ratio, the SN ratio of the pixel end tends to increase with the increase in A, so that the influence of the distance A on the alignment stability is large. From the relationship between the distance B and the SN ratio, the SN ratio is stable within the range of 0 μm≤B≤5.1 μm, but the SN ratio is greatly decreased in the range of B>5.1 μm.

The angle D is also the same as in the case of the distance B, and it can be said that the SN ratio is stable within the range of 6.5°≤D≤25°, but the SN ratio is greatly decreased when D<6.5°. D≤20° is preferable. Regarding the angle C, the SN ratio is −1.11 dB or more, being the reference of alignment stability, in the range of 0°≤C≤20°, and the influence on the alignment stability is small.

From the above, it is considered that the distance A has the largest influence on the alignment stability, then the influence of the distance B and the angle D is large, and the influence of the angle C is the smallest. In the electrode structure in which the above A to D are within the above ranges, the alignment of the liquid crystal at the pixel end during white display in the second drive system is stabilized. In the following, the result of study of the reason why the correlation between this electrode structure and the alignment stability of the liquid crystal can be seen will be described in detail.

<Reason for Improvement in Alignment Stability of Pixel End During White Display of Second Drive System in Example 1 Over in Comparative Example 1>

[Regarding Distance (A)]

Figure 26:
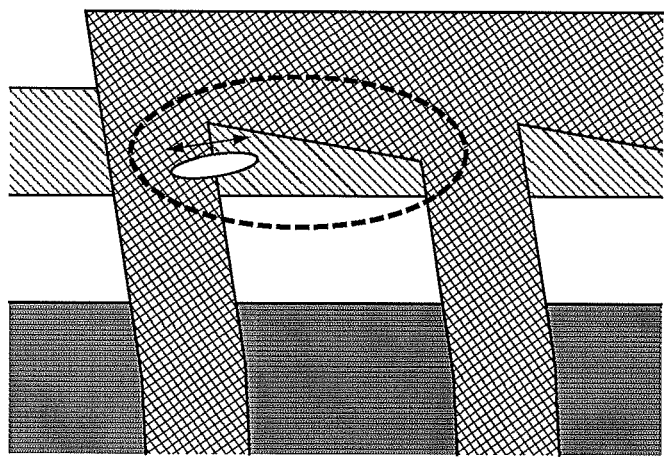
FIG. 26 is a schematic plan view for illustrating the relationship between the distance A and the alignment stability of liquid crystal molecules during white display of the second drive system.

FIG. 26 is a schematic plan view for illustrating the relationship between the distance A and the alignment stability of liquid crystal molecules during white display of the second drive system.

The liquid crystal rotates in an orientation perpendicular to the edge of the upper layer electrode (i). When the distance A changes, the area of the region surrounded by the broken line in FIG. 26 (the region where the opening of the first electrode and the branch portion of the second electrode overlap each other) changes, and as the area increases, the fringe electric field generated between the upper layer and the lower layer electrodes becomes stronger, the number of liquid crystal molecules aligned in a desired orientation is increased, and stable alignment can be obtained. That is, the larger the value of A is, the more stable the alignment of the liquid crystal is.

[Regarding Distance (B)]

Since the liquid crystal rotates in an orientation perpendicular to the edge of the upper layer electrode (i), the larger the inclination of the slit, the more easily the liquid crystal rotates in the desired orientation. The closer the bending point of the branch portion of the upper layer electrode (i) is to the center line between the upper and lower ends of the branch portion of the lower layer electrode (iii) (the smaller the value of the distance B is), the more the region where the inclination of the slit is large increases, so that the number of liquid crystal molecules likely to be aligned in a desired orientation increases, and as a result, the liquid crystal at the pixel end portion is also likely to be aligned in a desired orientation.

[Regarding Angle C]

Figure 27:
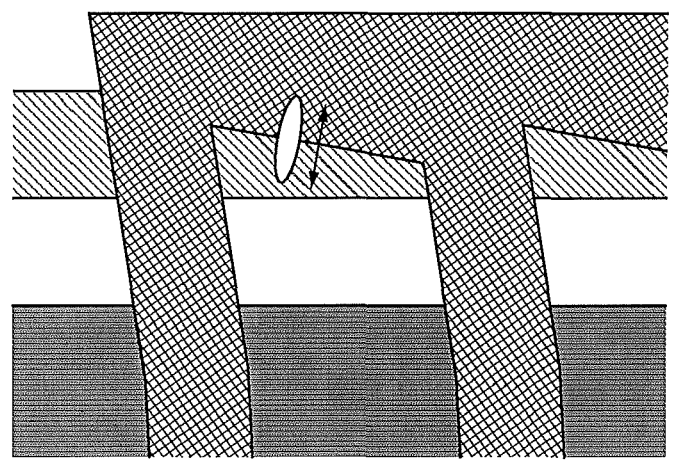
FIG. 27 is a schematic plan view for illustrating the relationship between the angle C and the alignment stability of liquid crystal molecules during white display of the second drive system.

FIG. 27 is a schematic plan view for illustrating the relationship between the angle C and the alignment stability of liquid crystal molecules during white display of the second drive system.

The liquid crystal rotates in an orientation perpendicular to the edge of the upper layer slit electrode.

As the angle C increases, the number of liquid crystal molecules aligned in a desired orientation increases, whereas the area where the opening of the upper layer electrode (i) and the branch portion of the lower layer electrode (ii) overlap each other decreases.

As a result, the smaller the value of the angle C is, the more stable the liquid crystal alignment at the pixel end is.

[Regarding Angle D]

Figure 28:
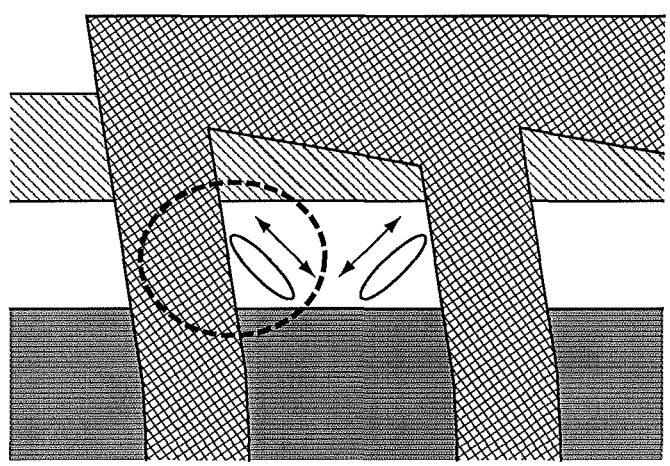
FIG. 28 is a schematic plan view for illustrating the relationship between the angle D and the alignment stability of liquid crystal molecules during white display of the second drive system.
Figure 29:
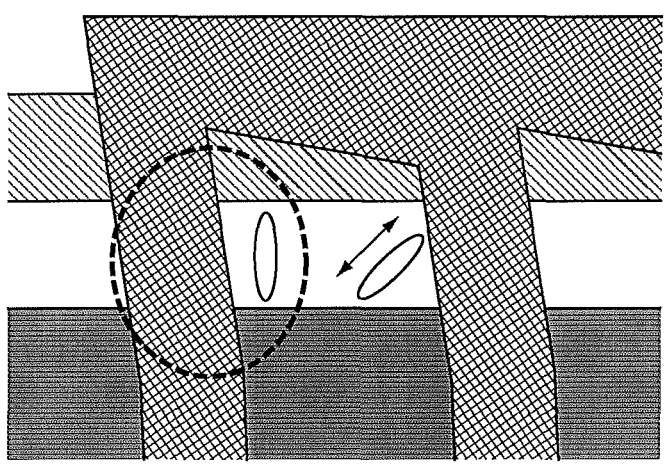
FIG. 29 is a schematic plan view for illustrating the relationship between the angle D and the alignment stability of liquid crystal molecules during white display of the second drive system.
Figure 30:
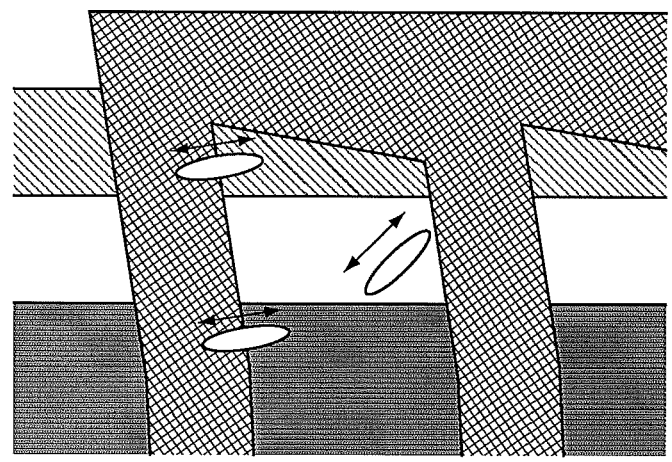
FIG. 30 is a schematic plan view for illustrating the relationship between the angle D and the alignment stability of liquid crystal molecules during white display of the second drive system.

FIGS. 28 to 30 are schematic plan views for illustrating the relationship between the angle D and the alignment stability of liquid crystal molecules during white display of the second drive system.

FIG. 28 shows the electrode structure of Comparative Example 1. In the electrode structure of Comparative Example 1, an electric field is generated in the vicinity of the intersection of the upper layer electrode and the lower layer electrode to cause the liquid crystal molecules to rotate in a direction opposite to the target direction, and alignment disorder of the liquid crystal occurs within the range surrounded by the broken line. FIGS. 29 and 30 show the electrode structure of Example 1. As shown in FIG. 29, as the inclination of the upper layer electrode (i) becomes larger, the generating source of the electric field for rotating the liquid crystal in the reverse orientation becomes farther, the liquid crystal does not rotate in the reverse direction within the range surrounded by the broken line, and alignment disorder does not occur. In addition, as shown in FIG. 30, since the liquid crystal rotates in an orientation perpendicular to the edge of the upper layer electrode (i), the larger the inclination is, the more easily the liquid crystal rotates in the desired orientation.

Comparative Example 1

Figure 31:
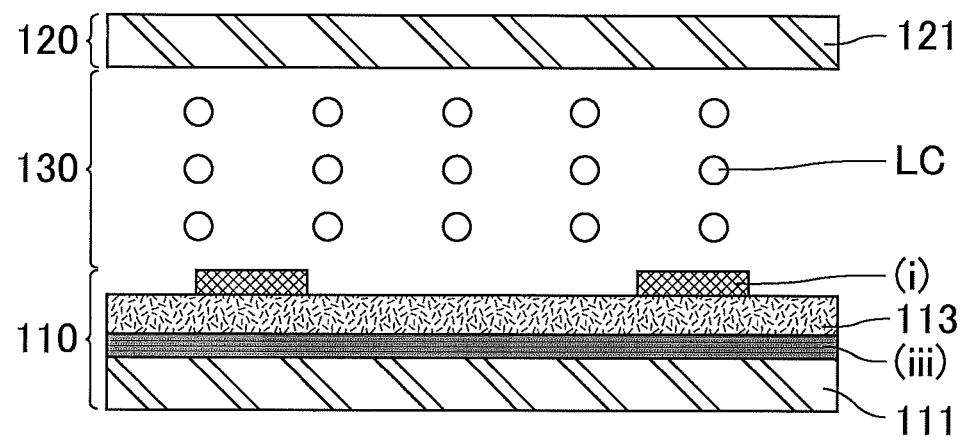
FIG. 31 is a schematic cross-sectional view showing the electrode structure and initial alignment of liquid crystal molecules of the liquid crystal display device of Comparative Example 1.
Figure 32:
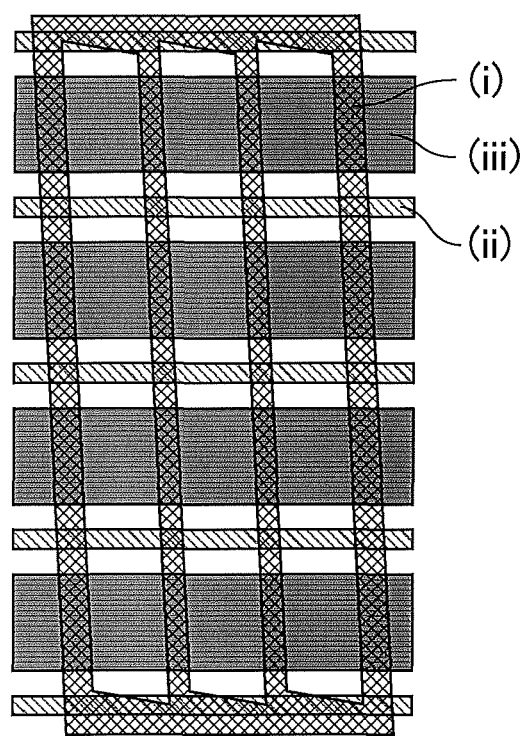
FIG. 32 is a schematic plan view showing an upper layer electrode and a lower layer electrode of the liquid crystal display device of Comparative Example 1.

FIG. 31 is a schematic cross-sectional view showing the electrode structure and initial alignment of liquid crystal molecules of the liquid crystal display device of Comparative Example 1. FIG. 32 is a schematic plan view showing an upper layer electrode and a lower layer electrode of the liquid crystal display device of Comparative Example 1.

The liquid crystal display device of Comparative Example 1 has the same structure as the liquid crystal display device of Example 1 described above, except that the angle D is 3°.

In the liquid crystal display device of Comparative Example 1, due to the specific electrode structure that the average width of the branch portions of the lower layer electrode (iii) is larger than the average width of the branch portions of the lower layer electrode (ii), the alignment stability of liquid crystal molecules during black display of the first drive system is improved, black floating can be prevented, and the contrast ratio in the first drive system can be greatly improved, but as described above, as compared with Example 1, the alignment stability at the pixel end was inferior during white display of the second drive system.

In the liquid crystal display device of the above Example, in the first drive system, during the rise time, since a lateral electric field is applied between a pair of comb-shaped electrodes of the lower layer, a strong electric field acts on the liquid crystal molecules in the entire region in the horizontal plane, so that the response speeds up, and during the falling time, since a strong restoring force by which the in-plane bend and splay alignment tends to return to its original as shown in FIG. 4 acts, and liquid crystal molecules react to the electric field generated by the lower layer comb-shaped electrodes, a high-speed response that cannot be achieved in the conventional FFS mode can be achieved.

In addition, in the second drive system, bringing the comb-shaped electrodes on the lower side of the two-layer electrodes to the same potential allows a fringe electric field to be generated between the comb-shaped electrodes and the slit electrode on the upper side, and the drive achieves a high transmittance as compared with the drive for achieving the high-speed response driven as described above.

One of the features of the above Example is that these two kinds of drive can be switched according to purpose and situation, and as a result, it is possible to achieve a wide viewing angle, high speed response, and high transmittance. It should be noted that since the liquid crystal display device of the present invention has the above-described three kinds of electrodes, at least the first drive system and the second drive system can be performed.

The liquid crystal display device of the above Example can appropriately switch between the first drive system and the second drive system to perform display. In addition, in each drive system, appropriately combining white display and black display according to a desired display can perform display.

The liquid crystal display device of the present invention preferably includes a control device for performing the above first drive system, and more preferably includes a control device for switching between the first drive system and the second drive system described above to perform the first drive system and the second drive system. Thus, a wide viewing angle can be achieved, a high-speed response can be achieved, and a high transmittance can be achieved. Therefore, it is possible to achieve a liquid crystal display device that satisfies all the characteristics of a high-speed response, a wide viewing angle, and a high transmittance with one type of electrode configuration.

In addition, the liquid crystal display device of the present invention preferably includes a control device that automatically switches between the first drive system and the second drive system according to a predetermined condition. For example, the control device preferably includes a temperature sensor and preferably automatically switches between the first drive system and the second drive system according to the temperature. For example, the control device is preferably a control device to control performing a second drive system capable of achieving a high transmittance in an environment of a temperature at which a delay in response speed does not matter (for example, a temperature range in which the lower limit is any one of −20° C. to 20° C.) and performing a first drive system capable of achieving a high speed response in an environment of a low temperature at which the response speed becomes slow (for example, a temperature range in which the upper limit is any one of −20° C. to 20° C.). Thus, desired effects can be more appropriately obtained. Furthermore, the liquid crystal display device of the present invention may include a control device for switching between the first drive system and the second drive system in accordance with instructions by the user. In addition, the present invention may include a driving method of a liquid crystal display device using the liquid crystal display device described above.

In addition, as in the liquid crystal display device of the present invention, when AC driving of a liquid crystal in which AC voltages are applied only to the electrodes of the lower substrate has only to be performed, the AC driving circuit, the driver, and the lines have only to be arranged only in the electrodes of the lower substrate in a conventional manner. Therefore, for example, as compared with a liquid crystal display device arranging AC driving circuits, drivers, and lines not only on the lower substrate but also on the upper substrate in order to applying AC voltages not only to the electrode of the lower substrate but also to the electrode of the upper substrate to perform AC driving of the liquid crystal, the degree of freedom of the drive of the liquid crystal display device of the present invention is remarkably high.

Examples of the liquid crystal display device of the present invention include a car-mounted device such as a car navigation system, an electronic book, a photo frame, industrial equipment, a television, a personal computer, a smart phone, a tablet terminal, and the like. The present invention is preferably applied to devices that can be used both in a high-temperature environment and in a low-temperature environment such as a car-mounted device such as a car navigation system.

REFERENCE SIGNS LIST (i) upper layer electrode
(ii) lower layer electrode
(iii) lower layer electrode
(iv) upper layer electrode
(v) lower layer electrode
CH contact hole
TFT thin-film transistor element
SL source bus line
GL gate bus line
LC liquid crystal molecules
10, 110 lower substrate
11, 21, 111, 121 glass substrate
13, 113 insulating layer
20, 120 upper substrate
30, 130 liquid crystal layer

The invention claimed is:

1. A liquid crystal display device comprising an upper substrate; a lower substrate; and a liquid crystal layer sandwiched between the upper substrate and the lower substrate,
wherein the lower substrate includes a first electrode, and a second electrode and a third electrode arranged in a layer different from the first electrode,
the first electrode includes a trunk portion and multiple branch portions branching from one side of the trunk portion and is provided with an opening between the branch portions,
the second electrode and the third electrode constitute a pair of comb-shaped electrodes and each include a trunk portion and multiple branch portions branching from one side of the trunk portion,
one of the branch portions of the second electrode has a part overlapping with the trunk portion of the first electrode and another part being in the opening of the first electrode when the lower substrate is viewed in a plan view so that an edge on the other side of the trunk portion of the first electrode extends in a lateral direction on an upper side of the first electrode,
the branch portions in the first electrode each include a bending point,
the liquid crystal display satisfies following Inequalities (1) to (4) where A is a vertical distance between an upper end and a lower end of the another part in the opening, B is a distance between the bending point and a center line between upper and lower ends of a branch portion of the third electrode, C is an angle formed between an extending direction of the branch portion of the second electrode and an extending direction of an edge on the one side of the trunk portion of the first electrode, and D is an angle formed between an extending direction of the trunk portion of the second electrode and an extending direction of an upper side portion from the bending point of a branch portion of the first electrode, and
the liquid crystal layer contains liquid crystal molecules aligned in a horizontal direction when no voltage is applied to each electrode, $$1.5 \ \mu m \leq A \tag{1}$$

$$0 \ \mu m \leq B \leq 5.1 \ \mu m \tag{2}$$

$$0° \leq C \leq 20° \tag{3}$$

$$6.5° \leq D \leq 25° \tag{4}$$

2. The liquid crystal display device according to claim 1, wherein the liquid crystal display device satisfies following Inequality (5):

$$D \leq 20° \tag{5}$$

3. The liquid crystal display device according to claim 1, configured to execute a driving operation,
wherein the driving operation causes an electrode included in the lower substrate to generate an electric field for rotating liquid crystal molecules so that not less than two first regions and not less than two second regions are alternately arranged in a pixel, the first regions each rotating a first group of the liquid crystal molecules in a horizontal plane with respect to a main surface of the upper and lower substrates, the second regions each rotating a second group of the liquid crystal molecules in a direction opposite to the first group of the liquid crystal molecules in a horizontal plane with respect to the main surface.

4. The liquid crystal display device according to claim 3, configured to switch between a first drive system and a second drive system, wherein the first drive system executes the driving operation, and the second drive system executes a driving operation of causing an electrode included in the lower substrate to generate an electric field for rotating liquid crystal molecules so that the number of first regions is not more than one and the number of second regions is not more than one in a pixel, the first regions each rotating a first group of the liquid crystal molecules in a horizontal plane with respect to a main surface of the upper and lower substrates, the second regions each rotating a second group of the liquid crystal molecules in a direction opposite to the first group of the liquid crystal molecules in a horizontal plane with respect to the main surface.

5. The liquid crystal display device according to claim 1, wherein the first electrode is provided with a slit, or is a comb-shaped electrode.

6. The liquid crystal display device according to claim 1, configured to execute a driving operation in which a potential difference between the first electrode and the third electrode is not less than a potential difference between the first electrode and the second electrode.

7. The liquid crystal display device according to claim 1, wherein an average width of a branch portion of the third electrode is larger than an average width of a branch portion of the second electrode.

8. The liquid crystal display device according to claim 1, wherein the first electrode is arranged on a side closer to the liquid crystal layer than the second electrode and the third electrode.

9. The liquid crystal display device according to claim 1, wherein the liquid crystal molecules have positive anisotropy of dielectric constant.

10. The liquid crystal display device according to claim 1, wherein the lower substrate includes a thin-film transistor element including an oxide semiconductor.

* * * * *